United States Patent [19]

Hamanishi

[11] Patent Number: 4,655,558
[45] Date of Patent: Apr. 7, 1987

[54] REAR FOCUS CONVERSION LENS APPARATUS

[75] Inventor: Yoshinari Hamanishi, Tokyo, Japan

[73] Assignee: Nippon Kogaku K. K., Tokyo, Japan

[21] Appl. No.: 632,103

[22] Filed: Jul. 18, 1984

[30] Foreign Application Priority Data

Jul. 27, 1983 [JP] Japan .................. 58-137375
Oct. 26, 1983 [JP] Japan .................. 58-200612

[51] Int. Cl.⁴ .................. G02B 9/12; G02B 9/34; G02B 9/60; G02B 15/02
[52] U.S. Cl. .................. 350/465; 350/463; 350/464
[58] Field of Search ............ 350/465, 463, 464, 422

[56] References Cited

U.S. PATENT DOCUMENTS

| Re. 30,708 | 8/1981 | Momiyama | 350/465 |
| 4,206,971 | 6/1980 | Hamanishi et al. | |
| 4,354,743 | 10/1982 | Mihara | 350/464 |
| 4,392,724 | 7/1983 | Hamanishi | 350/463 |
| 4,591,234 | 5/1986 | Hamanishi | 350/422 |

FOREIGN PATENT DOCUMENTS 28133 3/1979 Japan.

Primary Examiner—John K. Corbin
Assistant Examiner—Rebecca D. Gass
Attorney, Agent, or Firm—Shapiro and Shapiro

[57] ABSTRACT

A rear conversion lens apparatus mounted between an objective lens and a camera body for enlarging the focal length of the composite system of the rear conversion lens apparatus and the objective lens more than the focal length of the objective lens includes a converter barrel removably mounted between the objective lens and the camera body, a lens group of negative refractive power movable along the optic axis within the converter barrel, the lens group of negative refractive power having a forward subgroup and a rearward subgroup, the forward subgroup having a negative meniscus lens disposed most adjacent to the object side and having its convex surface facing the object side and a positive lens disposed on the image side of the negative meniscus lens, and moving means for moving the lens group of negative refractive power along the optic axis. Focusing to objects at infinity to a short distance is effected by the movement of the negative lens group by the moving means.

28 Claims, 46 Drawing Figures

SPHERICAL ABERRATION

ASTIGMATISM
--- MERIDIONAL
— SAGITAL

DISTORTION

LATERAL CHROMATIC ABERRATION

COMA

SPHERICAL ABERRATION

ASTIGMATISM
--- MERIDIONAL
— SAGITAL

DISTORTION

LATERAL CHROMATIC ABERRATION

COMA

SPHERICAL ABERRATION

ASTIGMATISM
--- MERIDIONAL
—— SAGITAL

DISTORTION

LATERAL CHROMATIC ABERRATION

COMA

SPHERICAL ABERRATION

ASTIGMATISM
--- MERIDIONAL
— SAGITAL

DISTORTION

LATERAL CHROMATIC ABERRATION

COMA

SPHERICAL ABERRATION

ASTIGMATISM
--- MERIDIONAL
—— SAGITAL

DISTORTION

LATERAL CHROMATIC ABERRATION

COMA

SPHERICAL ABERRATION

ASTIGMATISM
--- MERIDIONAL
—— SAGITAL

DISTORTION

LATERAL CHROMATIC ABERRATION

COMA

SPHERICAL ABERRATION

ASTIGMATISM
- - - MERIDIONAL
—— SAGITAL

DISTORTION

LATERAL CHROMATIC ABERRATION

COMA

SPHERICAL ABERRATION

ASTIGMATISM
--- MERIDIONAL
— SAGITAL

DISTORTION

LATERAL CHROMATIC ABERRATION

COMA

SPHERICAL ABERRATION

ASTIGMATISM
--- MERIDIONAL
——— SAGITAL

DISTORTION

LATERAL CHROMATIC ABRRATION

COMA

SPHERICAL ABERRATION

ASTIGMATISM
- - - MERIDIONAL
—— SAGITAL

DISTORTION

LATERAL CHROMATIC ABERRATION

COMA

SPHERICAL ABERRATION

ASTIGMATISM
--- MERIDIONAL
—— SAGITAL

DISTORTION

LATERAL CHROMATIC ABERRATION

COMA

SPHERICAL ABERRATION

ASTIGMATISM
- - - MERIDIONAL
—— SAGITAL

DISTORTION

LATERAL CHROMATIC ABERRATION

COMA

SPHERICAL ABERRATION

ASTIGMATISM
--- MERIDIONAL
— SAGITAL

DISTORTION

LATERAL CHROMATIC ABERRATION

COMA

SPHERICAL ABERRATION — F=2.9, d-line, g-line
ASTIGMATISM — y=21.6, --- MERIDIONAL, —— SAGITAL, d-line, g-line
DISTORTION — y=21.6

LATERAL CHROMATIC ABERRATION y=21.6, g-line

COMA y=21.6, y=15.1, y=10.8, y=0

SPHERICAL ABERRATION

ASTIGMATISM
--- MERIDIONAL
—— SAGITAL

DISTORTION

LATERAL CHROMATIC ABERRATION

COMA

SPHERICAL ABERRATION

ASTIGMATISM
--- MERIDIONAL
——— SAGITAL

DISTORTION

LATERAL CHROMATIC ABERRATION

COMA

SPHERICAL ABERRATION
F=2.88
d-line, g-line
−0.5   0   0.5

ASTIGMATISM
--- MERIDIONAL
— SAGITAL
y=21.6
d-line, g-line
−0.5   0   0.5

DISTORTION
y=21.6
−2.5   0   2.5%

LATERAL CHROMATIC ABERRATION
y=21.6
g-line
−0.1   0   0.1

COMA
y=21.6
y=15.1
y=10.8
y=0

SPHERICAL ABERRATION

ASTIGMATISM
--- MERIDIONAL
— SAGITAL

DISTORTION

LATERAL CHROMATIC ABERRATION

COMA

SPHERICAL ABERRATION

ASTIGMATISM
- - - MERIDIONAL
—— SAGITAL

DISTORTION

LATERAL CHROMATIC ABERRATION

COMA

REAR FOCUS CONVERSION LENS APPARATUS

BACKGROUND OF THE INVENTION

1. Field of the Invention

This invention relates to a rear conversion lens apparatus for focusing which can be mounted to a lens for a single lens reflex camera and can be versatilely used.

2. Description of the Prior Art

Various lenses capable of being automatically focused have already been commercialized in single lens reflex camera, but all of them are exclusive lenses capable of automatically focusing only particular lenses and therefore have no versatility and moreover have been expensive.

Therefore, the construction of a focusing converter in which a lens system exclusively for focusing is mounted beween an objective lens and a camera body to enable automatic focusing to be versatilely accomplished is proposed, for example, by Japanese Laid-Open Patent Application No. 28133/1979, but this has not withstood practical use. That is, in order that a converter may be mountable to all objective lenses, it must be a compact one mountable not only to great aperture ratio objective lenses but also to objective lenses having a short back focal length and moreover must maintain an excellent imaging performance, and it has been very difficult to design a converter which will satisfy all of these conditions.

SUMMARY OF THE INVENTION

It is an object of the present invention to provide a rear conversion lens apparatus for focusing, namely, a rear focus conversion lens apparatus (hereinafter simply referred to as RFC), which is versatilely mountable to various objective lenses and also mountable particularly to objective lenses having a short back focal length and which is compact and yet can maintain an excellent imaging performance.

The RFC according to the present invention is a rear conversion lens apparatus mounted between an objective lens and a camera body for enlarging the focal length of the composite system of the rear conversion lens apparatus and the objective lens more than the focal length of the objective lens, and has a forward subgroup and a rearward subgroup movable on the optical axis relative to the objective lens and the camera body, and can be focused to objects at infinity to a predetermined short distance by movement of the two subgroups, the forward subgroup having a negative meniscus lens disposed most adjacent to the object side and having its convex surface facing the object side and a positive lens disposed on the image side of the negative meniscus lens.

That is, the RFC according to the present invention is characterized in that basically it has a construction similar to the RFC disclosed in the inventor's prior application (Japanese Patent Application No. 32194/1982, corresponding to U.S. application Ser. No. 459,980 now U.S. Pat. No. 4,591,234) and yet, particularly, as the forward subgroup of the RFC, a negative meniscus lens having its convex surface facing the object side is disposed most adjacent to the object side.

The invention will become more fully apparent from the following detailed description thereof taken in conjunction with the accompanying drawings.

BRIEF DESCRIPTION OF THE DRAWINGS

FIGS. 10A, 10B to 17A, 17B show the various aberrations in the first to eighth embodiments, respectively, A of these Figures showing the infinity in-focus state and B of these Figures showing the closest distance in-focus state.

FIGS. 31A, 32B to FIGS. 34A, 34B show the various aberrations in the twelfth to fifteenth embodiments, A of these Figures showing the various aberrations during the infinity in-focus in which each RFC is mounted, and B of these Figures showing the various aberrations when focusing is effected to the close distance by movement of each RFC.

DETAILED DESCRIPTION OF THE PREFERRED EMBODIMENTS

The RFC according to the present invention will hereinafter the described by reference to the drawings.

Figure 1:
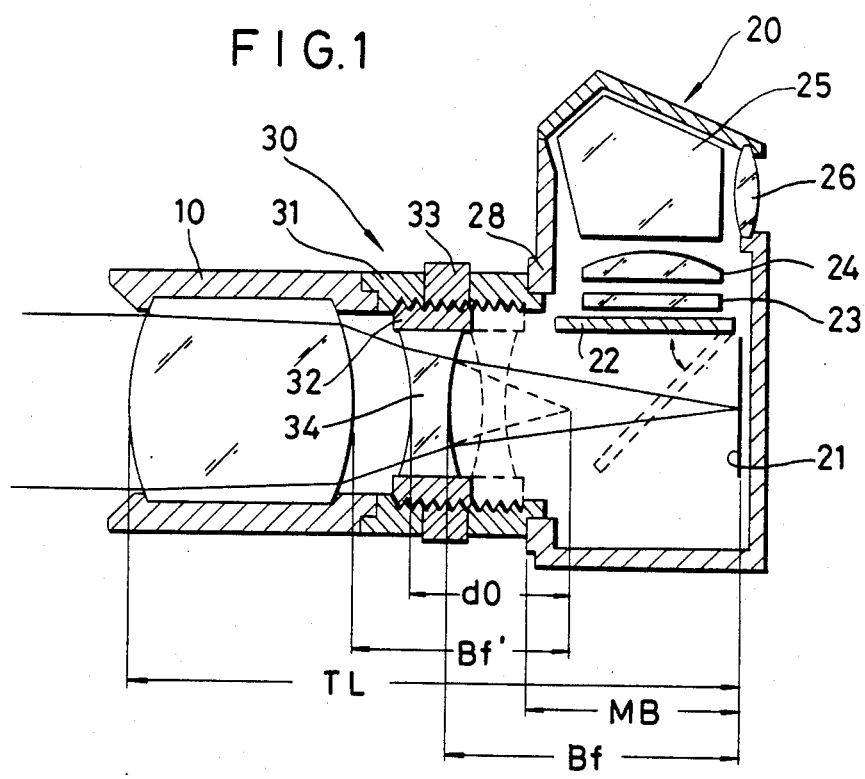
FIG. 1 is a cross-sectional view schematically showing the construction of the rear focus conversion lens apparatus according to the present invention as mounted between an objective lens and a single lens reflex camera body.

FIG. 1 is a cross-sectional view schematically showing the construction in a state in which the RFC 30 according to the present invention is mounted between an objective lens 10 and a single lens reflex camera body 20. In the Figure, the marginal ray from the on-axis infinite object point reaching a film surface 21 is depicted. The single lens reflex camera body 20 has a pivotable reflecting mirror 22, a focusing screen 23, a condenser lens 24, a pentadach prism 25 and an eyepiece 26. The reflecting mirror 22 is normally disposed obliquely at a position indicated by dotted line during the other times than the exposure of the film surface 21. In the single lens reflex camera, to secure the pivoting space of the pivotable reflecting mirror 22, the distance between the lens mount surface 28 of the single lens reflex camera body 20 and the film surface 21, i.e., the so-called flange back MB, is determined to a value inherent to the camera body. The distance between the last lens surface of the objective lens and the film surface, i.e., the back focal length Bf', is designed to be sufficiently longer the pivoting space of the reflecting mirror 22.

In the RFC 30, an internal lens barrel 32 having a negative lens group 34 is provided within a converter lens barrel 31 for movement in the direction of the optic axis by a focus ring 33. Accordingly, by rotating the focus ring 33, the negative lens group 34 is moved along the optic axis toward an image side position indicated by dotted line in FIG. 1 and focusing to an object at a predetermined distance is accomplished.

Accordingly, even in a state in which the RFC is mounted to the objective lens, the back focal length Bf of the composite system of the RFC and the objective lens must be secured at a value greater than the pivoting space of the reflecting mirror 22 and further, even in a case where the principal point of the negative lens group forming the RFC is moved toward the image side for the focusing to a short distance object, it is necessary to maintain a sufficient back focal length.

Thus, the RFC according to the present invention must intactly satisfy the condition as the rear conversion lens and at the same time, must satisfy various conditions to sufficiently achieve the focusing function as well. Specifically, in order to keep the in-focus accuracy good even if a large aperture objective lens or a small aperture objective lens is mounted to satisfy the versatility, there is an upper limit in the enlargement magnification borne by the RFC and also, it is not desirable that a sufficient back focal length be secured even during close distance photography and the amount of movement of the RFC be made very great and therefore, there is also a lower limit in the enlargement magnification.

Also, the RFC according to the present invention effects focusing by being moved in the limited space between the objective lens and the camera body and therefore, is subjected to a limitation from this point as well.

That is, during the closest distance in-focus, the RFC is moved on the optic axis most toward the image side. In order that the RFC may be established as a single lens reflex lens system at this time, a sufficiently long back focal length is necessary and therefore, the lens system of the RFC must be maldistributed toward the objective lens side as much as possible.

On the other hand, the back focal length of the ordinary objective lens for single lens reflex cameras is determined to a minimum necessary value to secure the pivoting space of the quick return mirror and, depending on the lens type, there are even objective lenses having a very short back focal length in this range. To satisfy the versatility, it is also necessary to enable an objective lens having such a back focal length to be mounted and if this is taken into consideration, the distance from the RFC to the image point by the objective lens, i.e., the object point distance of the RFC, cannot be made very long and there is a limit in the way of maldistributing the lens system of the RFC. If compared with the ordinary conventional rear conversion lens which is not moved, the difference between the distances from the positions at which the oblique light flux and the light flux from the on-axis object point cut the rear conversion lens to the optic axis is small and therefore, the degree of freedom of aberration correction is small and it is very difficult to correct various aberrations well over the full range of focusing.

There is also a method of shortening the lens length as the RFC (the length from the foremost surface to the last surface of the RFC) and securing the back focal length to widen as much as possible the area in which focusing can be effected by the RFC, but again this method has a limit in aberration correction, because it becomes difficult to secure the degree of freedom of aberration correction by making a sufficient air space in the RFC.

Therefore, in the present invention, it has been found that by a negative meniscus lens having its convex surface facing the object side being disposed at the side of the RFC which is most adjacent to the objective lens, as described above, the achromatizing efficiency is enhanced and particularly the on-axis chromatic aberration can be easily corrected and further correction of higher order chromatic spherical aberration is also easy. By widening the air space between the forward subgroup and the rearward subgroup as much as possible, the outward coma of the light ray above the principal ray at the medium angle of view can be corrected and even the inward coma of the light ray below the principal ray can be corrected.

Also, as regards the aberration fluctuation when the RFC has been moved on the optic axis toward the image side to effect finite distance focusing, it has been found that the system of the present invention in which a negative lens precedes is smaller in fluctuation than the system disclosed in the aforementioned prior application wherein a positive lens precedes and is more advantageous in maintaining a stable imaging performance.

In such a basic construction of the present invention, specifically, the RFC of a first type in which the forward subgroup has a convergent refractive power and the rearward subgroup has a divergent refractive power and the RFC of a second type in which the forward subgroup has a divergent refractive power and the rearward subgroup has a convergent refractive power have been developed.

Description will first be made of the RFC of the first type in which the forward subgroup has a convergent refractive power and the rearward subgroup has a divergent refractive power. In the RFC of the first type, it is desirable that the following conditions be satisfied:

$1.3 < \beta < 2.5$           (1)

$|\Delta Bf/f_R| < 0.2$           (2)

$0.4 < |Bf/d_0 \cdot \beta| < 0.9$           (3)

$-2.0 < f_2/f_1 < -0.31$           (4)

$0.6 < |f_1/f_R| < 1.8$           (5)

$$0.3 < |f_2/fR| < 0.6 \quad (6)$$

where $\beta$ is the enlargement magnification of the focal length in the infinity in-focus state, $\Delta Bf$ is the amount of variation in the composite back focal length $Bf$ when focusing is effected from infinity to a predetermined short distance, $fR$ is the focal length of the rear conversion lens apparatus, $d_0$ is the distance from the vertex of the lens surface of the rear conversion lens apparatus which is most adjacent to the object side to the image point by said objective lens, and $f_1$ and $f_2$ are the focal lengths of said forward subgroup and said rearward subgroup, respectively.

The respective conditions in the RFC of the first type according to the present invention will hereinafter be described.

If the upper limit of condition (1) is exceeded, aberration correction will become difficult and the number of lenses will be increased. Also, the F-number of the composite lens system will become too great and the lens system will become dark. Therefore, sufficient accuracy of distance measurement can be obtained only by a light objective lens and the system will lack the versatility. If the lower limit of condition (1) is exceeded, when an attempt is made to effect focusing to a predetermined close distance, the amount of movement of the RFC will become too great and on the other hand, when focusing is effected with the back focal length as a single lens reflex lens being secured, the area in which focusing can be effected will become narrow, and this is practically unsuitable.

If condition (2) is exceeded, it will become necessary to increase the distance $d_0$ from the vertex of the foremost lens surface of the RFC to the image point by the objective lens and the number of objective lenses to which the RFC can be mounted will become too small and this in turn will lead to the lack in versatility, and this is unsuitable. Also, $fR$ will become shorter and the refractive power of the RFC will become too strong and therefore, correction of astigmatism and Petzval sum will become difficult and the aberration fluctuation when focusing has been effected to the closest distance by movement of the RFC will become greater, and this also is unsuitable.

If the upper limit of condition (3) is exceeded, the lens length of the RFC will become too short and Petzval sum will become excessively great in the negative sense and the degree of freedom of aberration correction will be lost. Also, $\beta$ will become too small and the range in which focusing can be effected will become small, and this is unsuitable. If the lower limit of condition (3) is exceeded, the magnification will become too great and therefore, correction of astigmatism will become difficult and the number of lenses will be increased. Moreover, the lens length of the RFC will become too long and this is unsuitable.

Condition (4) prescribes a proper distribution of the refractive power of the rearward group relative to the forward group of the RFC and, if the upper limit of this condition is exceeded, the refractive power of the forward subgroup of a positive refractive power will become too strong and it will become difficult to secure a back focal length sufficient for focusing, and this is unsuitable. If the lower limit of condition (4) is exceeded, correction of spherical aberration will become difficult and this is unsuitable. Conditions (5) and (6) supplement said condition (4) and, if these conditions are departed from, the balance of the refractive powers of the forward subgroup and the rearward subgroup will be destroyed and correction of the various aberrations will become difficult. In condition (4), it is more preferable in respect of correction of the various aberrations that $-0.6 < f_2/f_1 < -0.31$.

In the RFC of the present invention as described above, it is desirable that with respect to the distance $d_0$ between the vertex of the foremost lens surface of the RFC and the image point by the objective lens and the distance between the objective lens mount surface of the camera body and the film surface, i.e., to so-called flange back $MB$, the following condition be satisfied:

$$0.7 < |d_0/MB| < 0.9.$$

In popular single lens reflex camera bodies, $MB = 46.5$ mm.

Further, to correct Petzval sum well, it is practical to satisfy the following conditions:

$$0.6 < \beta \cdot d_0/fR < 1.0$$

$$0.4 < d_0/fR < 0.7$$

Also, as regards the specific lens construction, the forward subgroup may comprise, in succession from the object side, a negative meniscus lens having its convex surface facing the object side and a biconvex positive lens, and these two lenses may be separate from each other or be cemented together and further, one more positive lens may be provided on the image side of the biconvex positive lens to allot the convergent refractive power as the foward subgroup to it. The rearward subgroup may comprise, in succession from the object side, a biconcave negative lens and a positive lens having its surface of sharper curvature facing the object side, and a cemented or single negative lens may be provided on the image side of these lenses to allot the divergent refractive power as the rearward subgroup to it.

Some embodiments of the RFC according to the present invention will be shown below. Each embodiment is designed with the objective lens shown in Table 1 being as the standard. This standard objective lens is described in applicant's Japanese Laid-open Patent Application No. 88020/1977.

In Table 1, R represents the radius of curvature of each lens surface, d represents the center thickness and air space of each lens, n represents the refractive index of each lens, $\nu$ represents the Abbe number of each lens, and the subscript numbers represent the order from the object side. Also, the numerical data of first to eighth embodiments of the RFC according to the present invention will be shown in Tables 2 to 9. In these tables, the numbers at the left end represent the order from the object side, $d_0$ represents the distance between the foremost lens surface of the RFC and the image point by the objective lens, $D_0$ represents the distance from the foremost lens surface of the objective lens to the object point, $D_1$ represents the air space between the objective lens and the RFC, $f_1$ represents the focal length of the forward subgroup $G_1$ of the RFC, and $f_2$ represents the focal length of the rearward subgroup $G_2$ of the RFC. Also, $Bf$ represents the back focal length of the composite system of the RFC and the standard objective lens, $\Delta Bf$ represents the amount of variation in the back focal length during the infinity in-focus and the close distance in-focus by the RFC, F represents the combined focal length of the RFC and the objective lens, and M represents the photographing magnification of the composite system.

TABLE 1

(Standard Objective Lens)

f = 51.6    F number 1.8    2ω = 46°

| | | |
|---|---|---|
| $R_1 = 41.000$ | $d_1 = 4.6$ | $n_1 = 1.79631$    $\nu_1 = 40.8$ |
| $R_2 = 197.900$ | $d_2 = 0.1$ | |
| $R_3 = 21.400$ | $d_3 = 4.7$ | $n_2 = 1.78797$    $\nu_2 = 47.5$ |
| $R_4 = 32.600$ | $d_4 = 1.0$ | |
| $R_5 = 51.000$ | $d_5 = 1.1$ | $n_3 = 1.74000$    $\nu_3 = 28.2$ |
| $R_6 = 16.200$ | $d_6 = 13.1$ | |
| $R_7 = -16.500$ | $d_7 = 1.3$ | $n_4 = 1.74000$    $\nu_4 = 28.2$ |
| $R_8 = -100.000$ | $d_8 = 5.4$ | $n_5 = 1.74443$    $\nu_5 = 49.4$ |
| $R_9 = -20.640$ | $d_9 = 0.1$ | |
| $R_{10} = 204.300$ | $d_{10} = 3.45$ | $n_6 = 1.79631$    $\nu_6 = 40.8$ |
| $R_{11} = -49.652$ | $B_f = 37.605$ | |

TABLE 2

(First Embodiment)

Magnification: $\beta = 1.6$    Focal length $f_R = -68.833$

| No. | Radius of curvature r | Center thickness and air space of lens d | Refractive index n | Abbe number ν |
|---|---|---|---|---|
| | ($G_1$) | | | |
| 1 | 83.096 | 1.0 | 1.87739 | 38.1 |
| 2 | 30.748 | 0.3 | | |
| 3 | 33.000 | 4.0 | 1.59507 | 35.5 |
| 4 | -50.075 | 3.0 | | |
| | ($G_2$) | | | |
| 5 | -47.917 | 1.0 | 1.84042 | 43.3 |
| 6 | 50.000 | 3.0 | 1.59507 | 35.5 |
| 7 | -56.281 | 0.5 | | |
| 8 | -46.820 | 1.0 | 1.84042 | 43.3 |
| 9 | 129.553 | 0.2 | | |
| 10 | 46.047 | 2.5 | 1.51118 | 50.9 |
| 11 | 219.390 | | | |

F = 82.56    M = -0.035

| | | |
|---|---|---|
| $D_0$ | ∞ | 2342.301 |
| $D_1$ | 1.0 | 2.91 |
| $B_f$ | 40.134 | 38.228 |

$d_0 = -36.605$
$f_1 = 82.740$
$f_2 = -35.800$
$\Delta B_f = -1.906$

TABLE 3

(Second Embodiment)

Magnification: $\beta = 1.6$    Focal length $f_R = -71.029$

| No. | Radius of curvature r | Center thickness and air space of lens d | Refractive index n | Abbe number ν |
|---|---|---|---|---|
| | ($G_1$) | | | |
| 1 | 87.706 | 1.0 | 1.87739 | 38.1 |
| 2 | 30.000 | 4.0 | 1.59507 | 35.5 |
| 3 | -43.691 | 2.5 | | |
| | ($G_2$) | | | |
| 4 | -40.754 | 1.0 | 1.84042 | 43.3 |
| 5 | 47.000 | 3.0 | 1.59507 | 35.5 |
| 6 | -54.708 | 0.5 | | |
| 7 | -46.820 | 1.0 | 1.80411 | 46.4 |
| 8 | 110.808 | 0.2 | | |
| 9 | 49.000 | 2.5 | 1.48749 | 70.2 |
| 10 | 22415.489 | | | |

F = 82.56    M = -0.045

| | | |
|---|---|---|
| $D_0$ | ∞ | 1819.096 |
| $D_1$ | 1.0 | 3.47 |
| $B_f$ | 41.319 | 38.850 |

$d_0 = -36.605$
$f_1 = 70.578$
$f_2 = -33.646$
$\Delta B_f = -2.469$

TABLE 4

(Third Embodiment)

Magnification: $\beta = 1.6$    Focal length $f_R = -70.098$

| No. | Radius of curvature r | Center thickness and air space of lens d | Refractive index n | Abbe number ν |
|---|---|---|---|---|
| | ($G_1$) | | | |
| 1 | 72.878 | 1.0 | 1.87739 | 38.1 |
| 2 | 30.085 | 0.3 | | |
| 3 | 33.000 | 4.0 | 1.59507 | 35.5 |
| 4 | -43.959 | 1.5 | | |
| | ($G_2$) | | | |
| 5 | -50.742 | 1.0 | 1.84042 | 43.3 |
| 6 | 50.000 | 3.0 | 1.59507 | 35.5 |
| 7 | -56.281 | 1.5 | | |
| 8 | -39.016 | 1.0 | 1.84042 | 43.3 |
| 9 | 129.553 | 0.2 | | |
| 10 | 46.000 | 2.5 | 1.51118 | 50.9 |
| 11 | 282.114 | | | |

F = 82.56    M = -0.040

| | | |
|---|---|---|
| $D_0$ | ∞ | 2048.036 |
| $D_1$ | 1.0 | 3.187 |
| $B_f$ | 40.979 | 38.792 |

$d_0 = -36.605$
$f_1 = 68.711$
$f_2 = -32.980$
$\Delta B_f = -2.187$

TABLE 5

(Fourth Embodiment)

Magnification: $\beta = 1.6$    Focal length $f_R = -70.201$

| No. | Radius of curvature r | Center thickness and air space of lens d | Refractive index n | Abbe number ν |
|---|---|---|---|---|
| | ($G_1$) | | | |
| 1 | 82.983 | 0.9 | 1.87739 | 38.1 |
| 2 | 31.768 | 0.3 | | |
| 3 | 33.000 | 4.5 | 1.59507 | 35.5 |
| 4 | -43.160 | 2.5 | | |
| | ($G_2$) | | | |
| 5 | -39.320 | 0.9 | 1.84042 | 43.3 |
| 6 | 50.000 | 3.5 | 1.59507 | 35.5 |
| 7 | -46.820 | 0.9 | 1.84042 | 43.3 |
| 8 | 119.922 | 0.2 | | |
| 9 | 46.047 | 2.4 | 1.51118 | 50.9 |
| 10 | 183.191 | | | |

F = 82.56    M = -0.045

| | | |
|---|---|---|
| $D_0$ | ∞ | 1818.611 |
| $D_1$ | 1.0 | 3.471 |
| $B_f$ | 41.043 | 38.572 |

$d_0 = -36.605$
$f_1 = 67.245$
$f_2 = -32.708$
$\Delta B_f = -2.471$

TABLE 6

(Fifth Embodiment)

Magnification: $\beta = 1.6$    Focal length $f_R = -70.937$

| No. | Radius of curvature r | Center thickness and air space of lens d | Refractive index n | Abbe number ν |
|---|---|---|---|---|
| | ($G_1$) | | | |
| 1 | 167.658 | 1.0 | 1.84042 | 43.3 |
| 2 | 33.242 | 0.3 | | |
| 3 | 36.248 | 4.5 | 1.59507 | 35.5 |
| 4 | -42.824 | 3.0 | | |
| | ($G_2$) | | | |
| 5 | -55.234 | 1.5 | 1.78797 | 47.5 |
| 6 | -82.202 | 0.8 | | |
| 7 | -39.911 | 0.9 | 1.84042 | 43.3 |
| 8 | 129.411 | 0.2 | | |
| 9 | 48.000 | 2.0 | 1.59507 | 35.5 |

TABLE 6-continued (Fifth Embodiment)

Magnification: $\beta = 1.6$   Focal length $f_R = -70.937$

| No. | r | d | n | ν |
|---|---|---|---|---|
| 10 | 116.867 | | | |

| | F = 82.56 | M = −0.055 |
|---|---|---|
| $D_0$ | ∞ | 1485.166 |
| $D_1$ | 1.0 | 4.045 |
| $B_f$ | 42.277 | 39.233 |

$d_0 = -36.605$
$f_1 = 96.531$
$f_2 = -39.688$
$\Delta B_f = -3.045$

TABLE 7

(Six Embodiment)

Magnification: $\beta = 1.6$   Focal length $f_R = -71.201$

| No. | Radius of curvature r | Center thickness and air space of lens d | Refractive index n | Abbe number ν |
|---|---|---|---|---|
| | ($G_1$) | | | |
| 1 | 94.020 | 1.0 | 1.84042 | 43.3 |
| 2 | 29.896 | 0.6 | | |
| 3 | 36.248 | 4.5 | 1.59507 | 35.5 |
| 4 | −40.400 | 1.5 | | |
| | ($G_2$) | | | |
| 5 | −55.234 | 1.5 | 1.78797 | 47.5 |
| 6 | −82.202 | 1.5 | | |
| 7 | −39.804 | 0.9 | 1.84042 | 43.3 |
| 8 | 129.411 | 0.2 | | |
| 9 | 34.000 | 2.0 | 1.59507 | 35.5 |
| 10 | 49.450 | | | |

| | F = 82.56 | M = −0.055 |
|---|---|---|
| $D_0$ | ∞ | 1485.322 |
| $D_1$ | 1.0 | 4.044 |
| $B_f$ | 42.887 | 39.843 |

$d_0 = -36.605$
$f_1 = 80.526$
$f_2 = -36.604$
$\Delta B_f = -3.044$

TABLE 8

(Seventh Embodiment)

Magnification: $\beta = 1.6$   Focal length $f_R = -71.603$

| No. | Radius of curvature r | Center thickness and air space of lens d | Refractive index n | Abbe number ν |
|---|---|---|---|---|
| | ($G_1$) | | | |
| 1 | 187.686 | 1.0 | 1.80411 | 46.4 |
| 2 | 31.726 | 0.3 | | |
| 3 | 36.248 | 4.0 | 1.59507 | 35.5 |
| 4 | −40.574 | 0.3 | | |
| 5 | −66.018 | 1.5 | 1.84042 | 43.3 |
| 6 | −64.555 | 3.0 | | |
| | ($G_2$) | | | |
| 7 | −35.234 | 1.0 | 1.84042 | 43.3 |
| 8 | 111.091 | 0.2 | | |
| 9 | 36.000 | 2.5 | 1.56732 | 42.7 |
| 10 | 60.398 | | | |

| | F = 82.56 | M = −0.055 |
|---|---|---|
| $D_0$ | ∞ | 1485.555 |
| $D_1$ | 1.0 | 4.043 |
| $B_f$ | 42.934 | 39.891 |

$d_0 = -36.605$
$f_1 = 93.554$
$f_2 = -39.591$
$\Delta B_f = -3.043$

TABLE 9

(Eighth Embodiment)

Magnification: $\beta = 1.6$   Focal length $f_R = -72.800$

| No. | Radius of curvature r | Center thickness and air space of lens d | Refractive index n | Abbe number ν |
|---|---|---|---|---|
| | ($G_1$) | | | |
| 1 | 417.231 | 1.0 | 1.84042 | 43.3 |
| 2 | 26.572 | 4.5 | 1.61293 | 37.0 |
| 3 | −40.846 | 4.0 | | |
| | ($G_2$) | | | |
| 4 | −35.938 | 1.0 | 1.84042 | 43.3 |
| 5 | 124.848 | 0.2 | | |
| 6 | 41.171 | 2.5 | 1.59507 | 35.5 |
| 7 | 83.046 | | | |

| | F = 82.56 | M = −0.06 |
|---|---|---|
| $D_0$ | ∞ | 1360.865 |
| $D_1$ | 1.0 | 4.332 |
| $B_f$ | 43.359 | 40.027 |

$d_0 = -36.605$
$f_1 = 114.603$
$f_2 = -43.570$
$\Delta B_f = -3.332$

The lens constructions of the first to eighth embodiments are shown in FIGS. 2 to 9, respectively. In the lens construction of the first embodiment shown in FIG. 2, there is also shown the lens construction of the standard objective lens of Table 1.

The various aberrations when the RFC's of the first to eighth embodiments are mounted to the standard objective lens shown in Table 1 are shown in FIGS. 10A, 10B to FIGS. 17A, 17B. A of these Figures shows the various aberrations during the infinity in-focus in which each RFC is mounted, and B of these Figures shows the various aberrations when each RFC is mounted and focusing to the close distance is effected by the RFC. In each of these aberration graphs, there are shown spherical aberration, astigmatism, distortion, lateral chromatic aberration of g-line ($\lambda$=435.8 nm) for the standard wavelength d-line ($\lambda$=587.6 nm), and coma.

Figure 18:
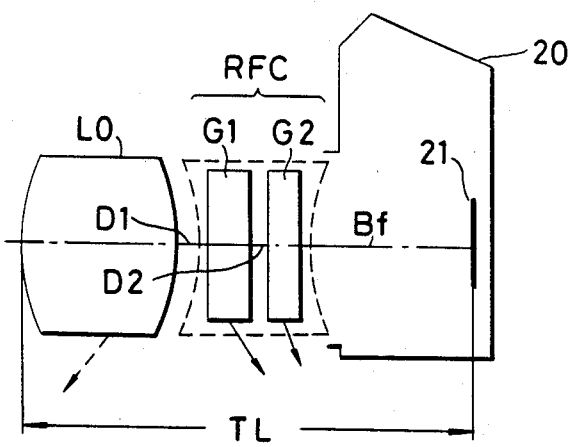
FIG. 18 schematically illustrates the construction of the composite system when another embodiment of the RFC according to the present invention is mounted between an objective lens and a camera body and focused to the infinity object.

Any of the first to eighth embodiments is of a construction in which the forward subgroup $G_1$ and the rearward subgroup $G_2$ are moved together toward the image side to thereby effect the focusing to the short distance object, but alternatively may be designed such that as shown in FIG. 18, the forward subgroup $G_1$ and the rearward subgroup $G_2$ are moved at different speeds to thereby effect focusing. In this case, it is possible to enhance the photographing magnification by short distance in-focus and it is also possible to correct the aberration fluctuations during the short distance in-focus.

Where the enlargement magnification $\beta$ of the RFC is a relatively high magnification, focusing can be sufficiently accomplished only by relative movement of the forward subgroup $G_1$ and the rearward subgroup $G_2$ of the RFC, but focusing can also be accomplished by adding movement of the objective lens $L_0$ itself to the image plane 21 at a relatively low magnification.

Figure 19:
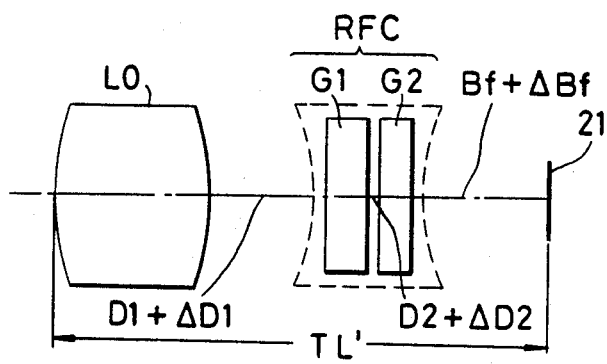
FIG. 19 schematically illustrates the construction when said another embodiment of the RFC is focused to a finite distance object.

Assuming that the RFC according to the present invention has been mounted between the objective lens $L_0$ and the camera body 20 and that the full length of the composite system (the distance from the foremost lens surface of the objective lens to the image plane 21) when focusing has been effected to the infinity object is TL and the full length when focusing has been effected to a finite distance object as shown in FIG. 19 is TL' and the distance $D_1$ between the objective lens $L_0$ and the forward subgroup $G_1$ of the RFC varies by $\Delta D_1$ from $D_1$ to $D_1+\Delta D_1$ and the distance $D_2$ between the forward subgroup $G_1$ of the RFC and the rearward subgroup $G_2$ of the RFC varies by $\Delta D_2$ from $D_2$ to $D_2+\Delta D_2$ and the back focal length $B_f$ of the composite system becomes $B_f+\Delta B_f$, the amount of variation $\Delta TL$ in the full length can be expressed as $\Delta TL=TL'-TL=\Delta D_1+\Delta D_2+\Delta B_f$.

Here, the coefficient value $\alpha$ obtained by dividing the amount of variation $\Delta TL$ in the full length by the amount of variation $\Delta B_f$ in the back focal length of the composite system is $$\alpha=\Delta TL/\Delta B_f=\Delta D_1/\Delta B_f+\Delta D_2/\Delta B_f+1.$$

If $$\alpha_1=\Delta D_1/\Delta B_f$$

$$\alpha_2=\Delta D_2/\Delta B_f$$

then $$\alpha=\alpha_1+\alpha_2+1 \quad (7)$$

and $\alpha_1$ and $\alpha_2$ are the rates of variation of the amount of variation $\Delta D_1$ in the distance between the objective lens $L_0$ and the forward subgroup $G_1$ of the RFC and the amount of variation $\Delta D_2$ in the distance between the forward subgroup $G_1$ and the rearward subgroup $G_2$ of the RFC, respectively, to the amount of variation $\Delta B_f$ in the back focal length of the composite system.

By the aforementioned equation (7), with respect to the form of movement regarding the RFC of the present invention, all of the cases except the case where the back focal length of the composite system does not vary, that is, all of the case where $\Delta B_f \neq 0$, can be represented. For example, the case where $\alpha=0$ means that the objective lens is fixed relative to the image plane and focusing is effected only by the RFC. However, the case where $\alpha=0$ and $\alpha_1=-1$ and $\alpha_2=0$ means the focusing system in which the forward and rearward subgroups $G_1$ and $G_2$ of the RFC are moved together, or the focusing system of the first to eighth embodiments.

In the present invention, it is desirable that during short distance in-focus, the forward subgroup $G_1$ and the rearward subgroup $G_2$ of the RFC be moved together to the image side and be moved so as to reduce the spacing between the two subgroups. With respect to the coefficient value $\alpha$ based on equation (7) above, it has been found that in the RFC of the first type of the present invention, it is appropriate to satisfy the following conditions:

$$-10<\alpha\leq 0 \quad (8)$$

$$\alpha_1<0 \quad (9)$$

$$0<\alpha_2<1 \quad (10)$$

Condition (8) means that because $\Delta B_f<0$, $\Delta TL\leq 0$ and the standard objective lens is positively moved toward the object side in the direction opposite to the RFC. By doing so, the closest distance can be shortened. Condition (9) shows that since $\Delta B_f<0$, the spacing between the RFC and the objective lens is widened. By doing so, the photographing magnification can also be positively earned by the RFC. If the upper limit of condition (10) is exceeded, astigmatism will become excessively negative, and this is unsuitable. If $\alpha_2$ becomes negative beyond the lower limit of condition (10), the spacing between the forward and rearward subgroups will be widened because $\Delta B_f<0$, and correction of spherical aberration which occurs excessively in the negative sense will become difficult.

Figure 20:
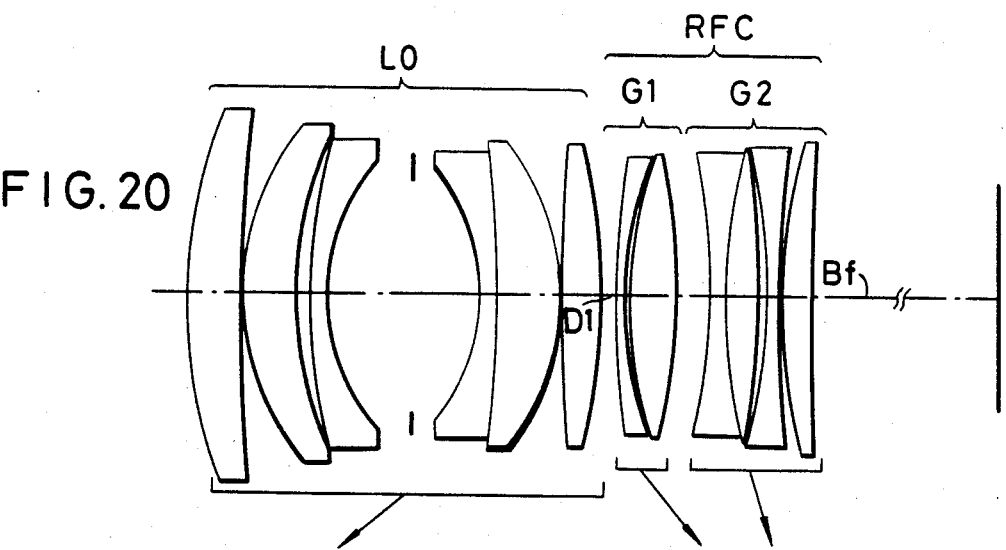
FIG. 20 shows the lens construction in the infinity in-focus state in which the RFC of a ninth embodiment is mounted to the standard objective lens.

FIG. 20 shows the lens construction of a ninth embodiment of the present invention. In this embodiment, the forward subgroup $G_1$ of the RFC is moved toward the image side at a higher speed than the rearward subgroup $G_2$ while, at the same time, the objective lens $L_0$ is moved toward the object side, whereby short distance in-focus is effected.

Figure 21:
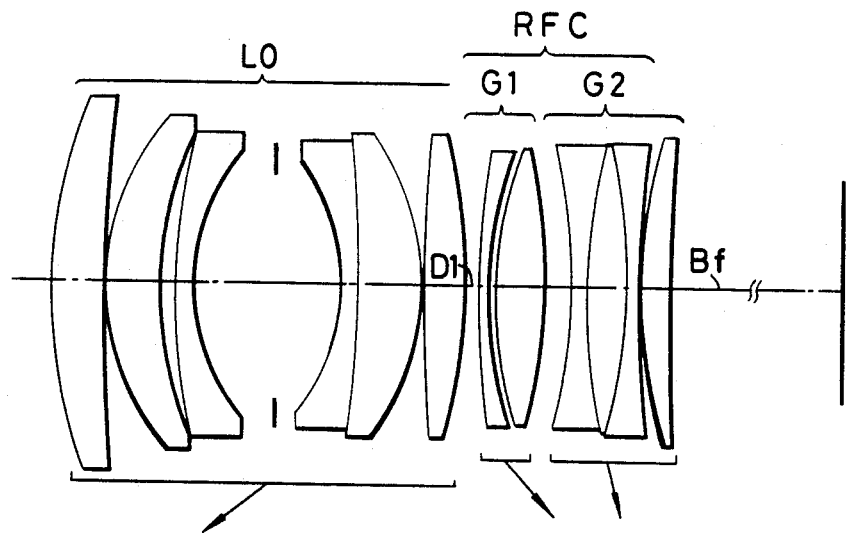
FIG. 21 shows the lens construction in the infinity in-focus state in which the RFC of a tenth embodiment is mounted to the standard objective lens.

FIG. 21 shows the lens construction of a tenth embodiment of the present invention. In this embodiment, as in the ninth embodiment shown in FIG. 20, the forward subgroup $G_1$ and the rearward subgroup $G_2$ of the RFC are moved toward the image side at different speeds and the objective lens $L_0$ is moved toward the object side, whereby short distance in-focus is effected.

Figure 22:
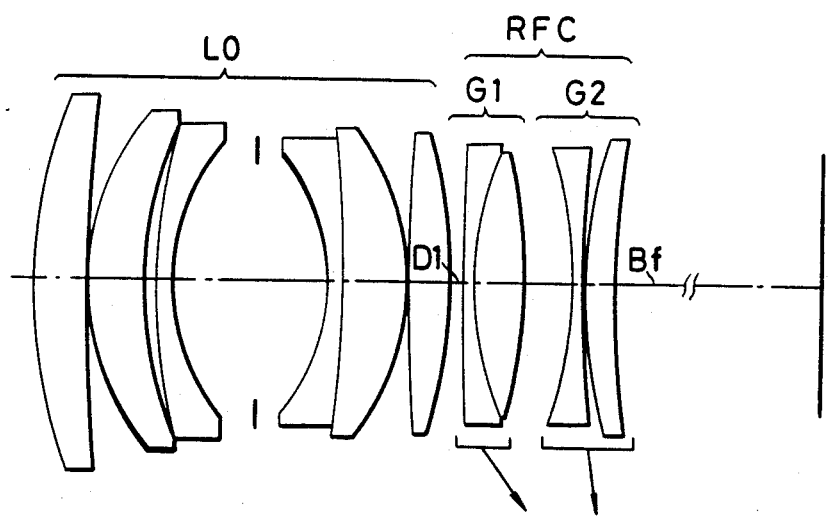
FIG. 22 shows the lens construction in the infinity in-focus state in which the RFC of an eleventh embodiment is mounted to the standard objective lens.

FIG. 22 shows the lens construction of an eleventh embodiment of the present invention. In this embodiment, during the short distance in-focus, the objective lens $L_0$ is fixed relative to the image plane and the forward subgroup $G_1$ of the RFC is moved toward the image side at a higher speed than the rearward subgroup $G_2$.

The numerical values of the ninth, tenth and eleventh embodiments will be shown in Tables 10, 11 and 12 below. These embodiments are based on the RFC's of the aforedescribed first, fourth and eighth embodiments, respectively.

TABLE 10

(Ninth Embodiment)

Magnification: $\beta = 1.6$  Focal length $f_R = -68.833$

| No. | Radius of curvature r | Center thickness and air space of lens d | Refractive index n | Abbe number ν |
|---|---|---|---|---|
|   | ($G_1$) |   |   |   |
| 1 | 83.096 | 1.0 | 1.87739 | 38.1 |
| 2 | 30.748 | 0.3 |   |   |
| 3 | 33.000 | 4.0 | 1.59507 | 35.5 |
| 4 | −50.075 | (variable) |   |   |
|   | ($G_2$) |   |   |   |
| 5 | −47.917 | 1.0 | 1.84042 | 43.3 |
| 6 | 50.000 | 3.0 | 1.59507 | 35.5 |
| 7 | −56.281 | 0.5 |   |   |
| 8 | −46.820 | 1.0 | 1.84042 | 43.3 |
| 9 | 129.553 | 0.2 |   |   |
| 10 | 46.047 | 2.5 | 1.51118 | 50.9 |
| 11 | 219.390 |   |   |   |

| F = 82.56 | | M = −0.15 | |
|---|---|---|---|
| $D_0$ | ∞ | | 572.968 |
| $D_1$ | 1.0 | | 6.752 |
| $d_4$ | 3.0 | | 2.712 |
| $B_f$ | 40.134 | | 39.271 |

$d_0 = -36.605$
$f_1 = 82.740$
$f_2 = -35.800$
$\Delta B_f = -0.863$
$\alpha = -5.331$
$\alpha_1 = -6.665$
$\alpha_2 = 0.334$

TABLE 11

(Tenth Embodiment)

Magnification: $\beta = 1.6$  Focal length $f_R = -70.202$

| Radius of curvature | Center thickness and air space of lens | Refractive index | Abbe number |
|---|---|---|---|

TABLE 11-continued (Tenth Embodiment)

Magnification: $\beta = 1.6$  Focal length $f_R = -70.202$

| No. | r | d | n | ν |
|---|---|---|---|---|
| | (G₁) | | | |
| 1 | 82.983 | 0.9 | 1.87739 | 38.1 |
| 2 | 31.768 | 0.3 | | |
| 3 | 33.000 | 4.5 | 1.59507 | 35.5 |
| 4 | −43.160 | (variable) | | |
| | (G₂) | | | |
| 5 | −39.320 | 0.9 | 1.84042 | 43.3 |
| 6 | 50.000 | 3.5 | 1.59507 | 35.5 |
| 7 | −46.820 | 0.9 | 1.84042 | 43.3 |
| 8 | 119.922 | 0.2 | | |
| 9 | 46.047 | 2.4 | 1.51118 | 50.9 |
| 10 | 183.190 | | | |

F = 82.56    M = −0.15

| | | |
|---|---|---|
| D₀ | ∞ | 568.502 |
| D₁ | 1.0 | 7.166 |
| d₄ | 2.5 | 2.253 |
| B_f | 41.043 | 39.193 |

$d_0 = -36.605$
$f_1 = 67.245$
$f_2 = -32.708$
$\Delta B_f = -1.850$
$\alpha = -2.200$
$\alpha_1 = -3.333$
$\alpha_2 = 0.134$

TABLE 12

(Eleventh Embodiment)

Magnification: $\beta = 1.6$  Focal length $f_R = -72.800$

| No. | Radius of curvature r | Center thickness and air space of lens d | Refractive index n | Abbe number ν |
|---|---|---|---|---|
| | (G₁) | | | |
| 1 | 417.231 | 1.0 | 1.84042 | 43.3 |
| 2 | 26.572 | 4.5 | 1.61293 | 37.0 |
| 3 | −40.846 | (variable) | | |
| | (G₂) | | | |
| 4 | −35.938 | 1.0 | 1.84042 | 43.3 |
| 5 | 124.848 | 0.2 | | |
| 6 | 41.171 | 2.5 | 1.59507 | 35.5 |
| 7 | 83.046 | | | |

F = 82.56    M = −0.06

| | | |
|---|---|---|
| D₀ | ∞ | 1361.404 |
| D₁ | 1.0 | 4.701 |
| d₃ | 4.0 | 3.815 |
| B_f | 43.359 | 39.843 |

Figure 23:
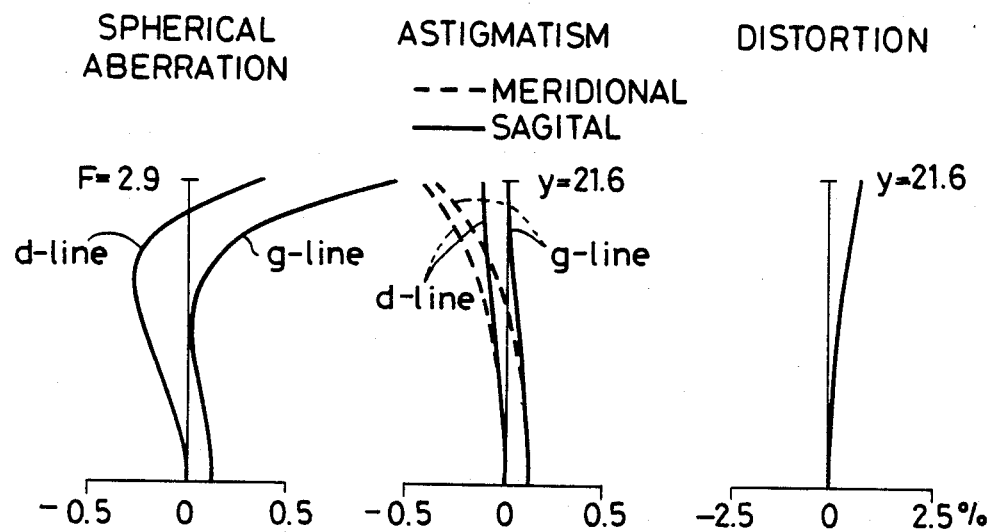
FIGS. 23 to 25 show the various aberrations in the closest distance in-focus state of the ninth, tenth and eleventh embodiments, respectively.
Figure 23:
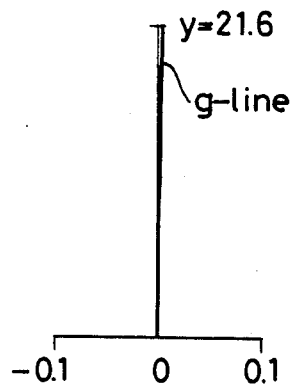
Figure 23:
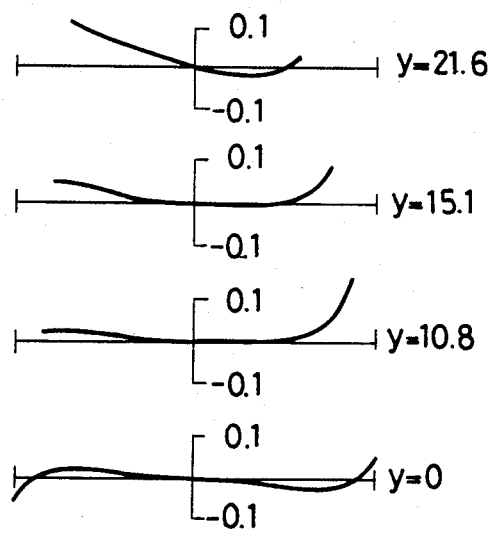
Figure 24:
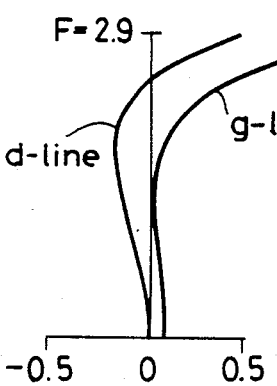
Figure 24:
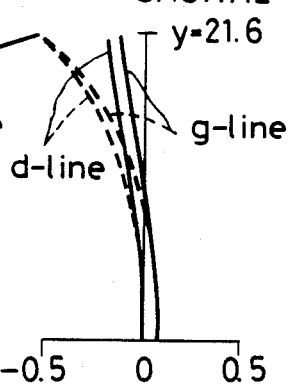
Figure 24:
Figure 24:
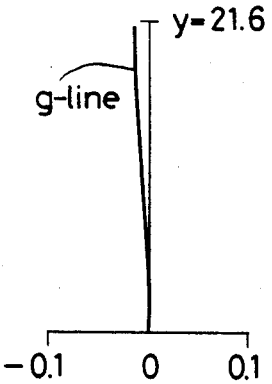
Figure 24:
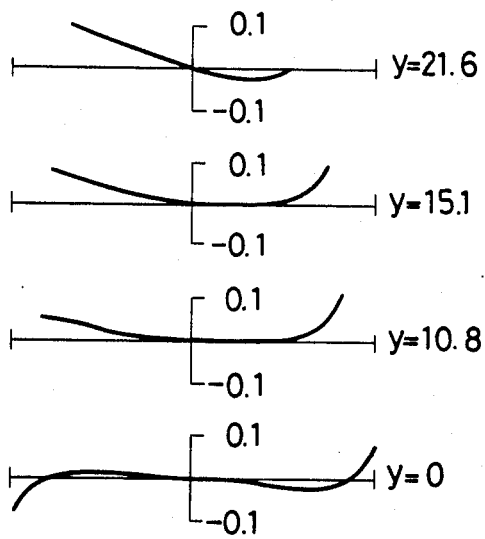
Figure 25:
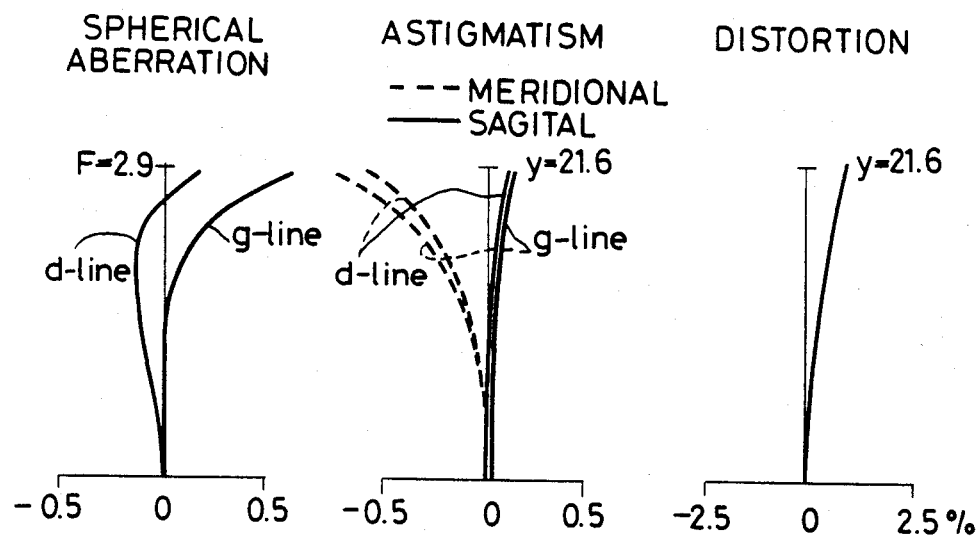
Figure 25:
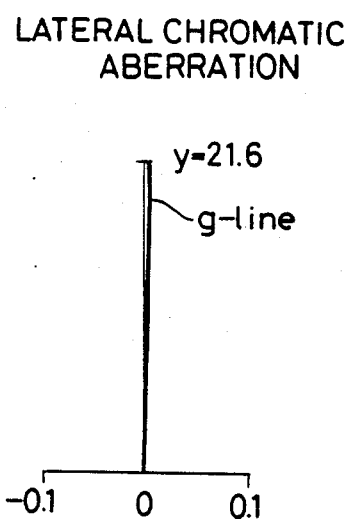
Figure 25:
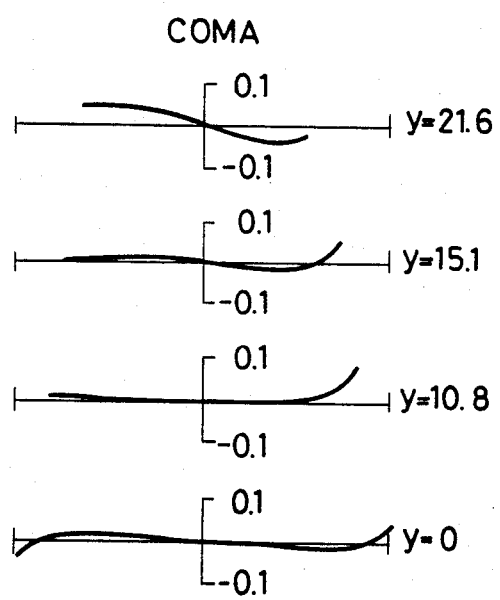

$d_0 = -36.605$
$f_1 = 114.603$
$f_2 = -43.570$
$\Delta B_f = -3.516$
$\alpha = 0$
$\alpha_1 = -1.053$
$\alpha_2 = 0.053$ The various aberrations in the closest distance state by the ninth, tenth and eleventh embodiments are shown in FIGS. 23, 24 and 25, respectively. The various aberrations during the infinity in-focus of these embodiments are the same as those shown in FIGS. 10A, 13A and 17A, respectively, and therefore are omitted.

From each of these aberration graphs, it is apparent that any of the embodiments of the RFC of the first type according to the present invention maintains an excellent imaging performance not only during the infinity in-focus but also during the short distance in-focus. Also, in the ninth and tenth embodiments, it can be seen that even the objective lens is auxiliarily moved toward the object side, whereby a practically sufficient imaging performance is maintained even at a high photographing magnification $M = -0.15$. Each of these embodiments can be mounted not only to the standard objective lens shown in Table 1 but also to various objective lenses and it is possible to simply accomplish focusing from infinity to a predetermined short distance while maintaining an excellent imaging performance in the same manner.

In the ninth to tenth embodiments, focusing is effected with the convergent forward subgroup and the divergent rearward subgroup in the present invention being moved relative to each other, and the short distance fluctuations of spherical aberration and astigmatism can be corrected by such a focusing system, but if, for example, only the positive lens in the RFC which is positioned most adjacent to the image side is moved at a different speed, it will be possible to correct astigmatism chiefly without varying spherical aberration very much as in the embodiment disclosed in the inventor's prior application (Japanese Patent Application No. 67061/1982, corresponding to U.S. application Ser. No. 459,980 now U.S. Pat. No. 4,591,234).

Figure 26:
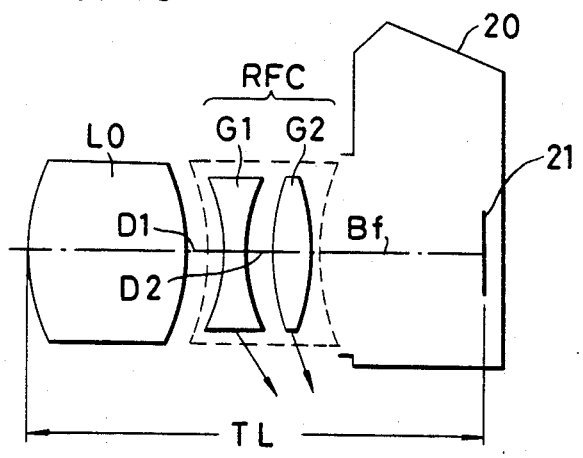
FIG. 26 schematically shows the construction of the composite system when the RFC of a second type according to the present invention is mounted between an objective lens and a camera body and focused to the infinity object.

The RFC of the second type according to the present invention will now be described. The RFC of the second type according to the present invention has a forward subgroup of divergent refractive power and a rearward subgroup of convergent refractive power and, as shown in FIG. 26, for the focusing, the forward subgroup and the rearward subgroup are moved at different speeds while the objective lens is maintained at a predetermined position relative to the image plane. The RFC of the second type satisfies the following conditions:

$$0.2 < |f_1/f_2| < 0.5 \tag{11}$$

$$0.3 < |f_R/f_2| < 1.6 \tag{12}$$

$$0.6 < |f_R/f_1| < 1.8 \tag{13}$$

$$1.3 < \beta < 2.5 \tag{14}$$

$$|\Delta B_f/f_R| < 0.2 \tag{15}$$

$$0.4 < |B_f/d_0\beta| < 0.9 \tag{16}$$

where $\beta$ is the enlargement magnification of the focal length of the objective lens during the infinity in-focus state, $\Delta B_f$ is the amount of variation in the composite back focal length $B_f$ when focusing is effected to infinity to a predetermined short distance, $f_R$ is the focal length of the rear conversion lens apparatus, $d_0$ is the distance from the vertex of the lens surface of the rear conversion lens apparatus which is most significant to the object side to the image point by the objective lens, and $f_1$ and $f_2$ are the focal lengths of the forward subgroup and the rearward subgroup, respectively.

Figure 2:
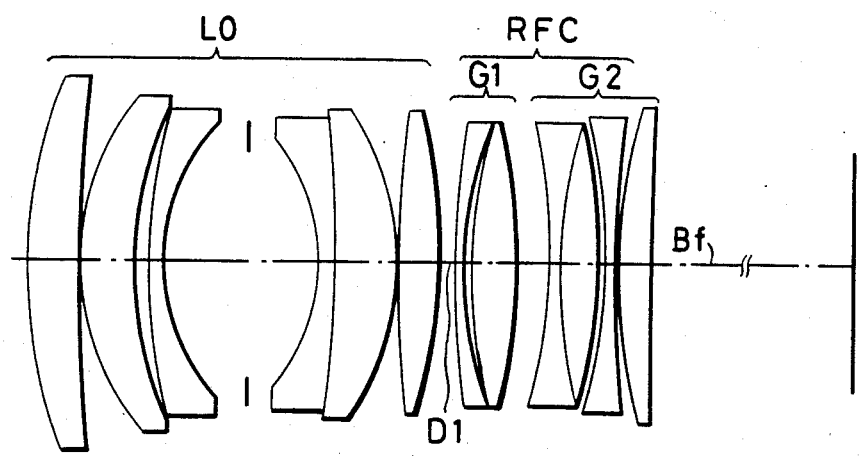
FIG. 2 shows the lens construction of a first embodiment of the present invention and also shows the positional relation between the standard objective lens in the infinity in-focus state and the rear focus conversion lens apparatus.
Figure 3:
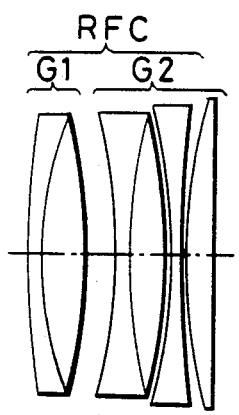
FIGS. 3 to 9 show the lens constructions of second to eighth embodiments, respectively.
Figure 4:
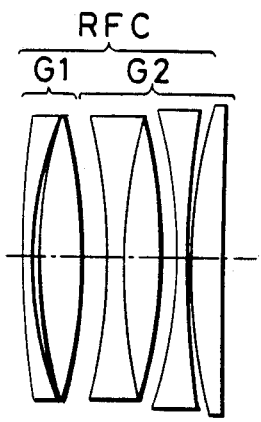
Figure 5:
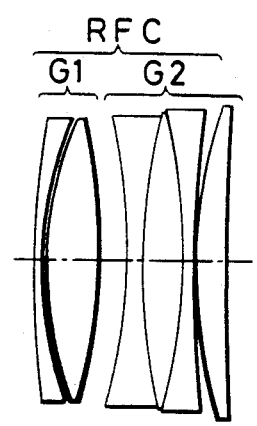
Figure 6:
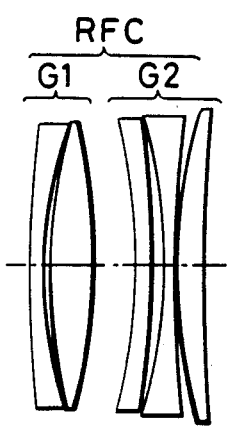
Figure 7:
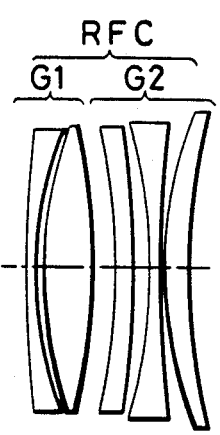
Figure 8:
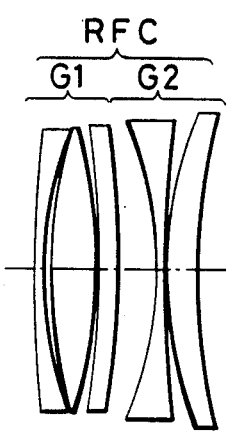
Figure 9:
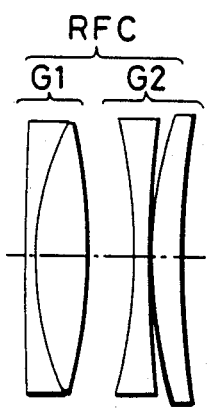
Figure 10A:
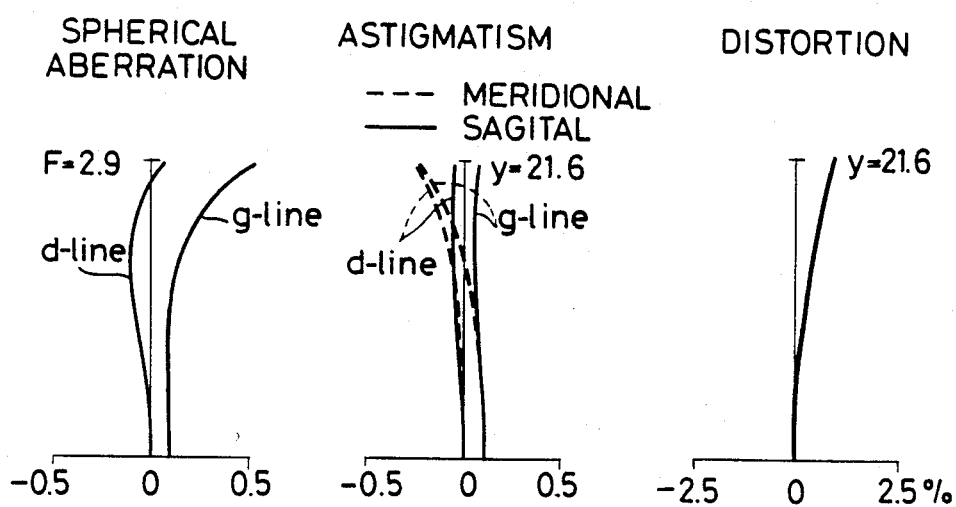
Figure 10A:
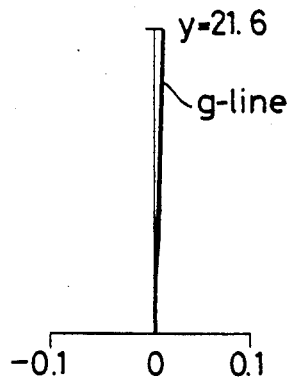
Figure 10A:
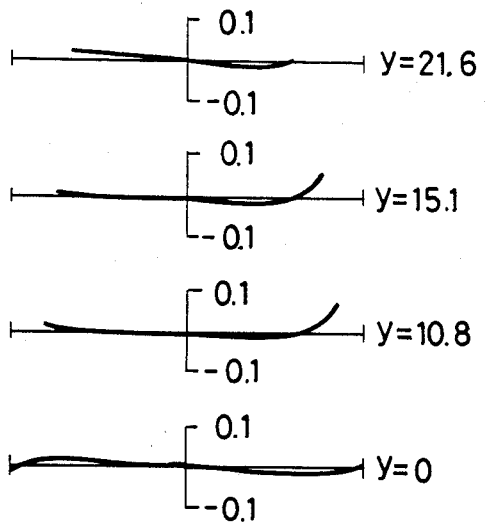
Figure 10B:
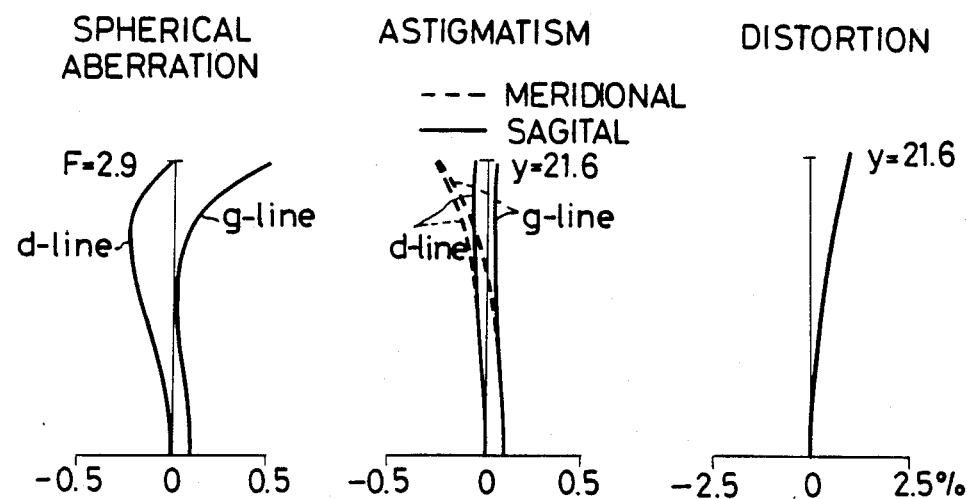
Figure 10B:
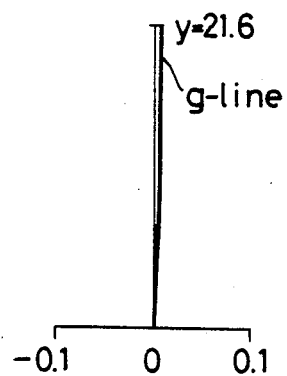
Figure 10B:
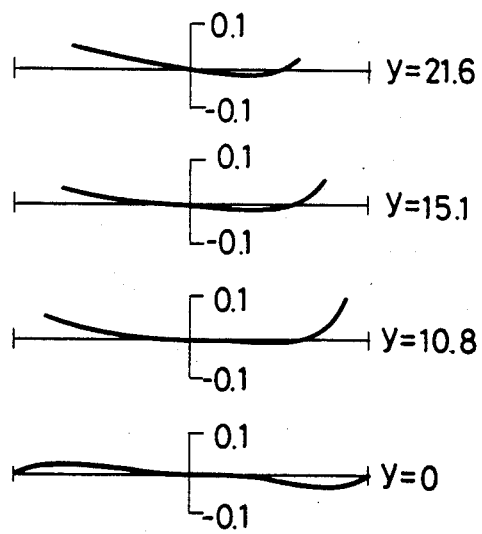
Figure 11A:
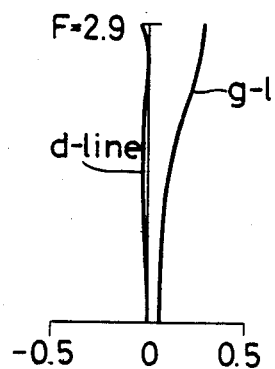
Figure 11A:
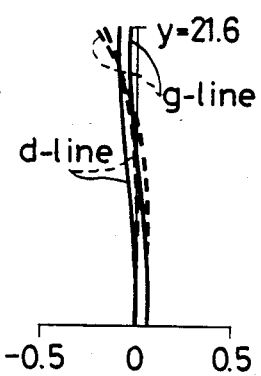
Figure 11A:
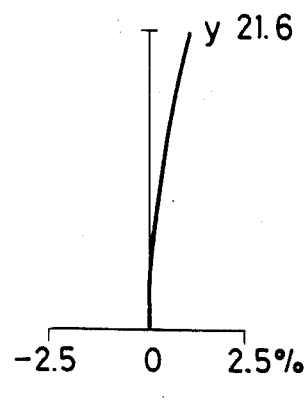
Figure 11A:
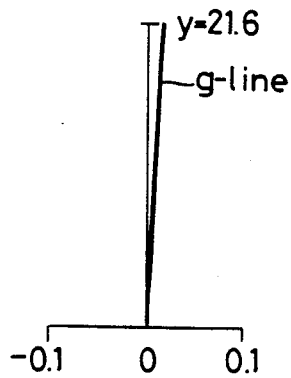
Figure 11A:
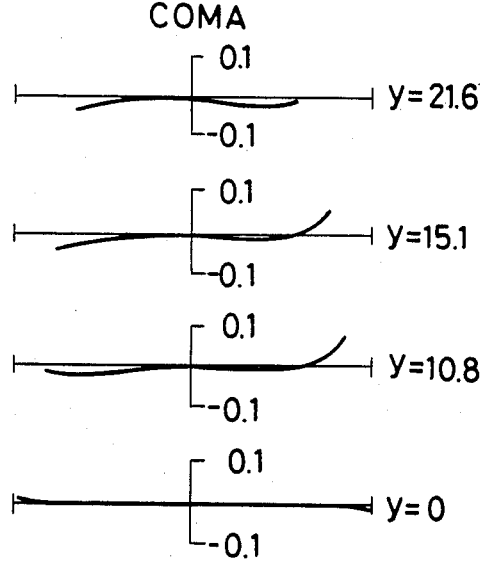
Figure 11B:
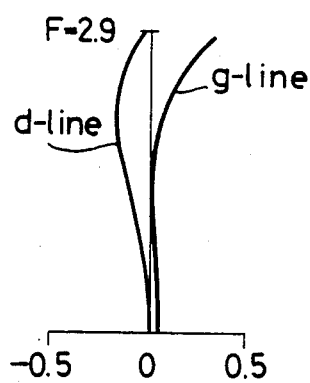
Figure 11B:
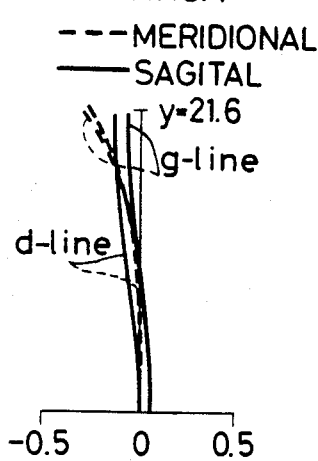
Figure 11B:
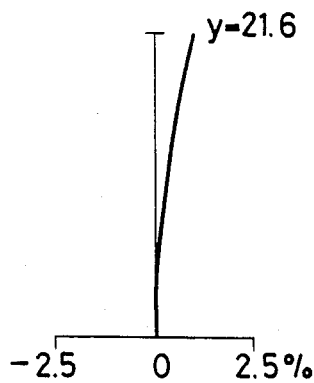
Figure 11B:
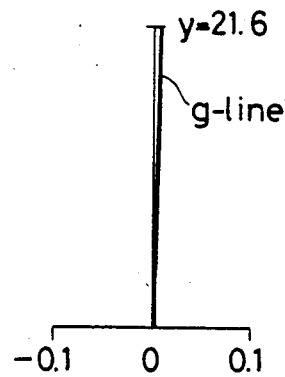
Figure 11B:
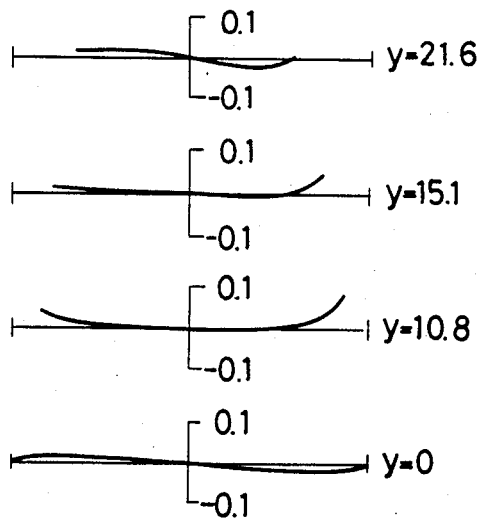
Figure 12A:
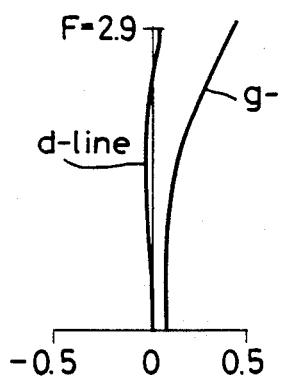
Figure 12A:
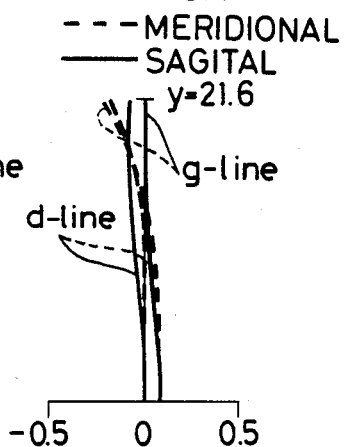
Figure 12A:
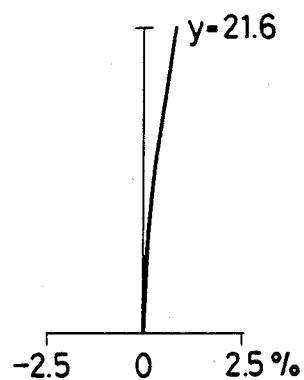
Figure 12A:
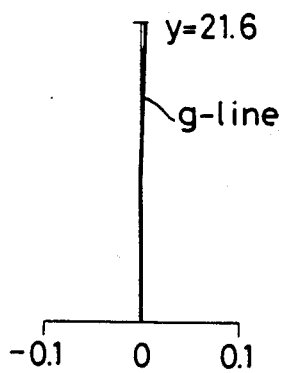
Figure 12A:
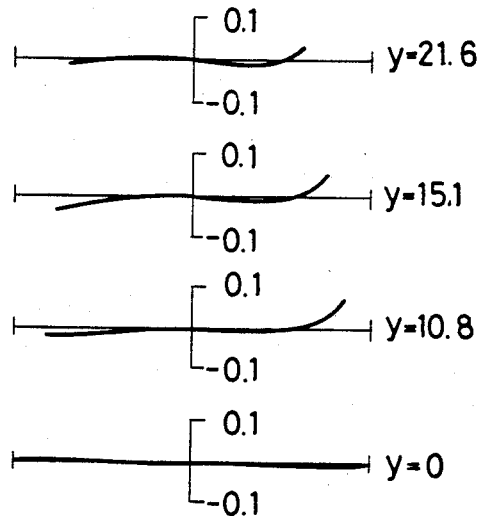
Figure 12B:
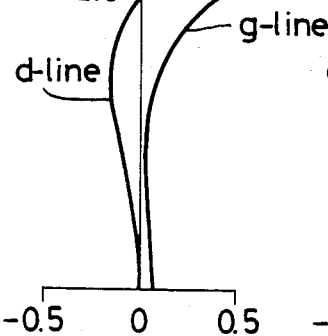
Figure 12B:
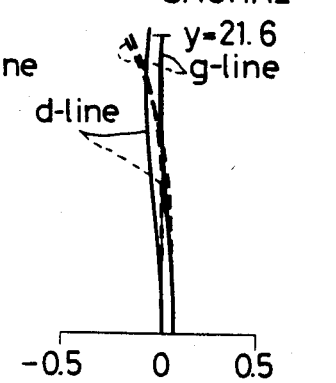
Figure 12B:
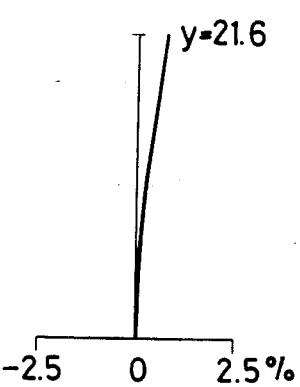
Figure 12B:
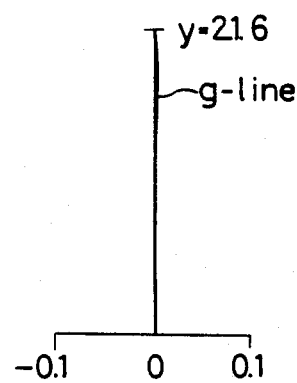
Figure 12B:
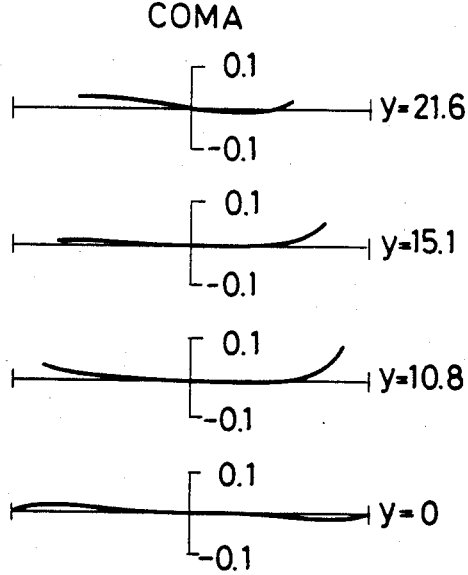
Figure 13A:
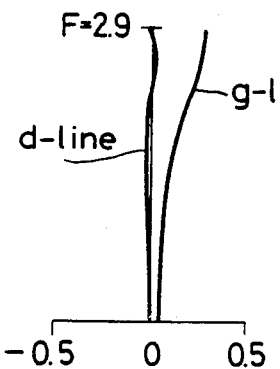
Figure 13A:
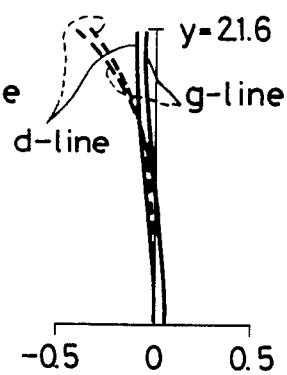
Figure 13A:
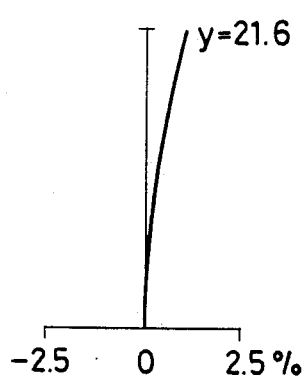
Figure 13A:
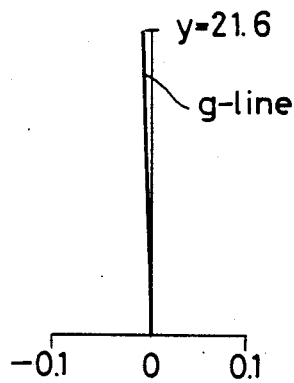
Figure 13A:
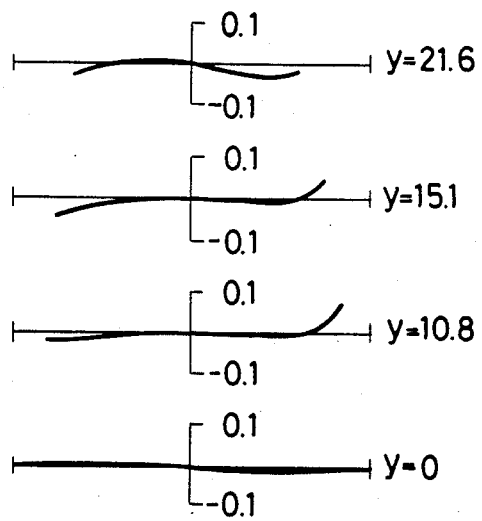
Figure 13B:
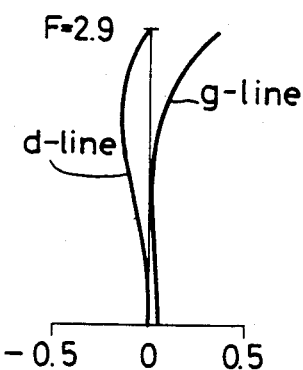
Figure 13B:
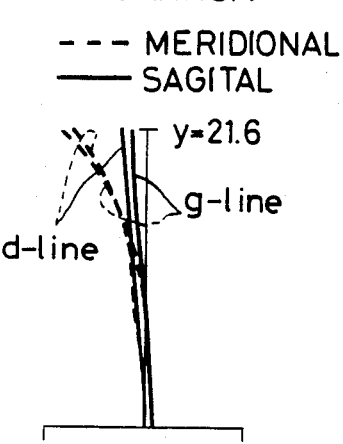
Figure 13B:
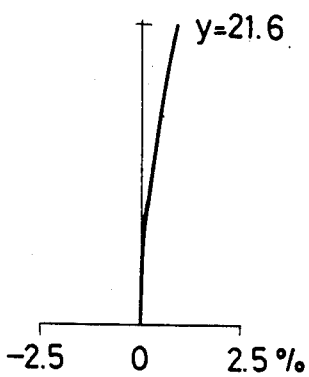
Figure 13B:
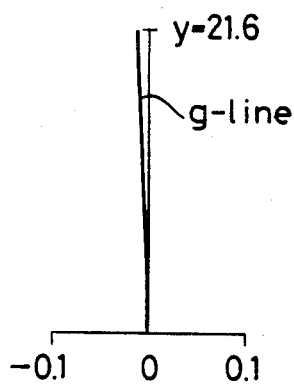
Figure 13B:
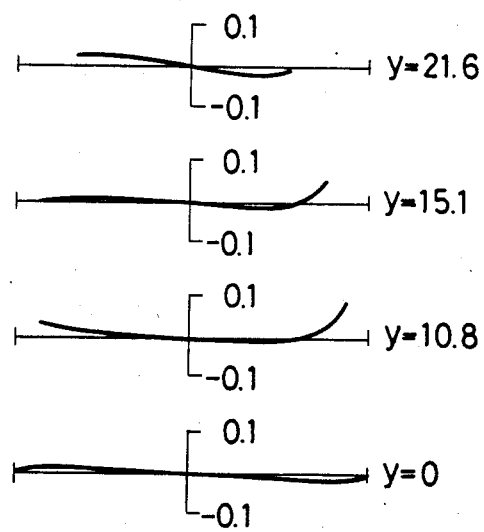
Figure 14A:
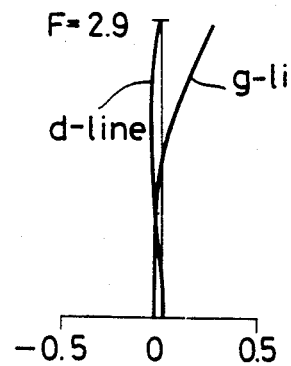
Figure 14A:
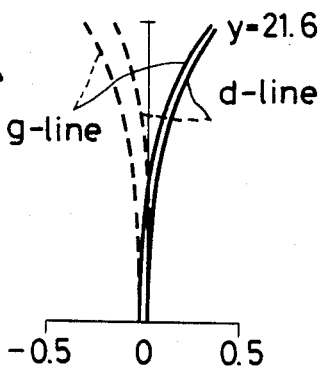
Figure 14A:
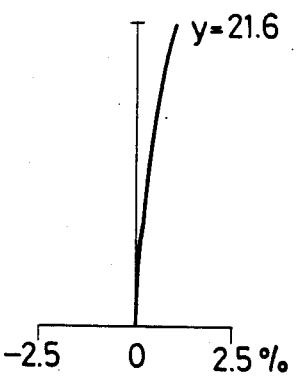
Figure 14A:
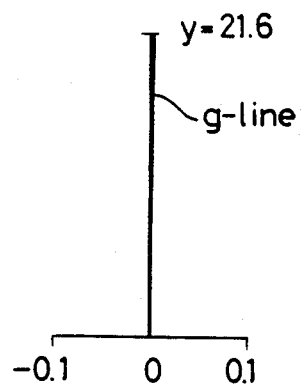
Figure 14A:
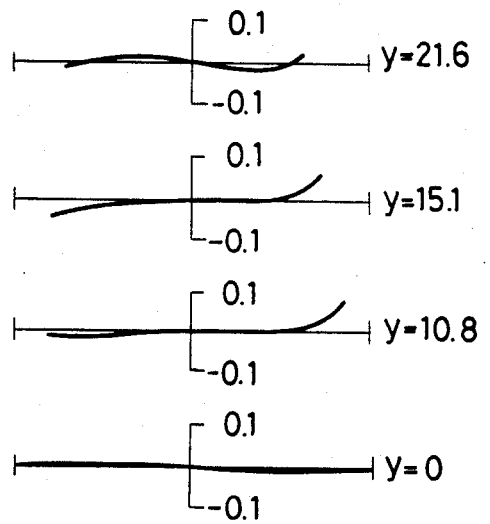
Figure 14B:
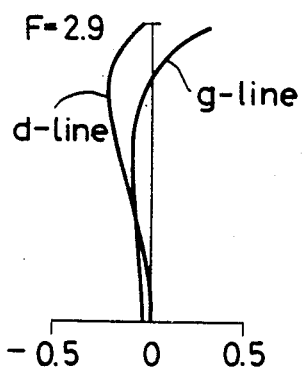
Figure 14B:
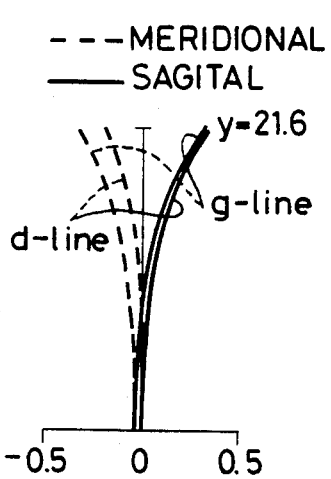
Figure 14B:
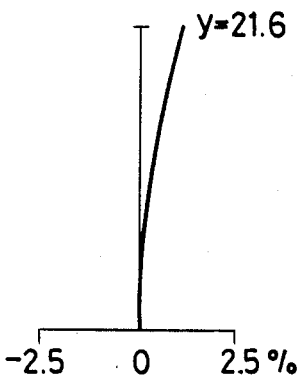
Figure 14B:
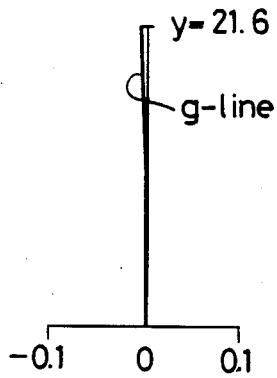
Figure 14B:
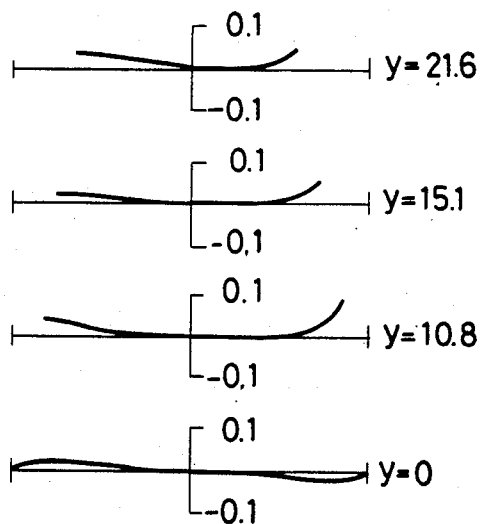
Figure 15A:
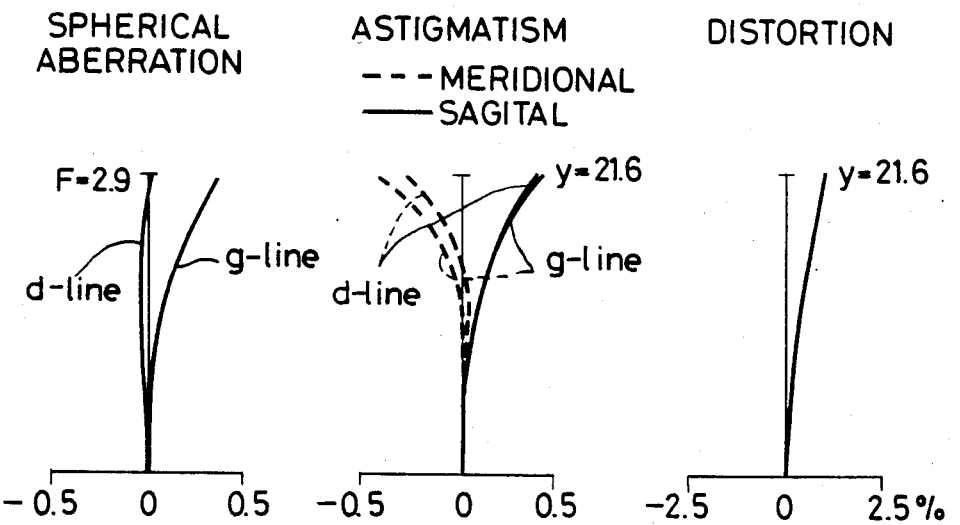
Figure 15B:
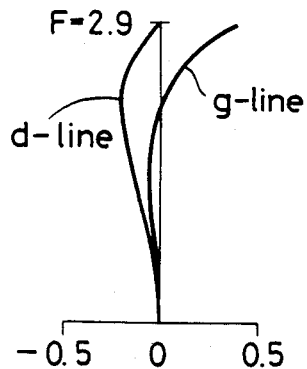
Figure 15B:
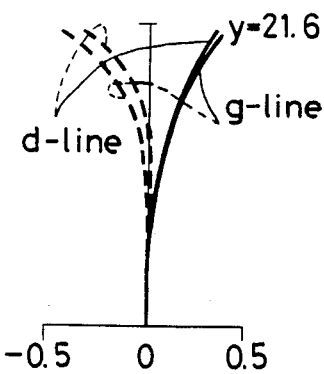
Figure 15B:
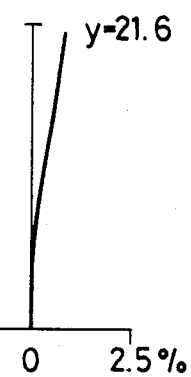
Figure 15B:
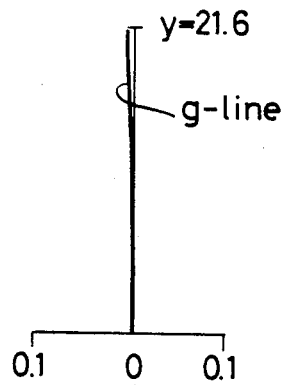
Figure 15B:
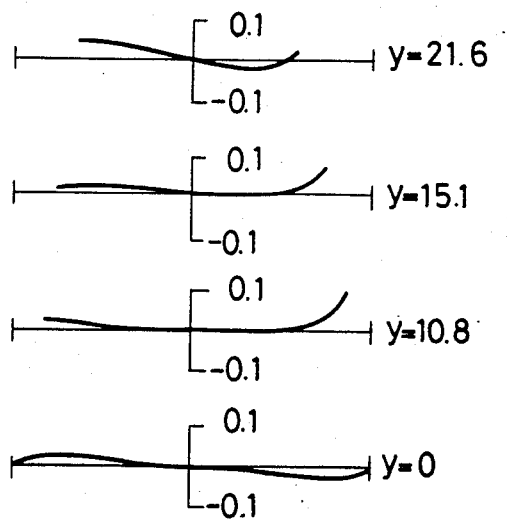
Figure 16A:
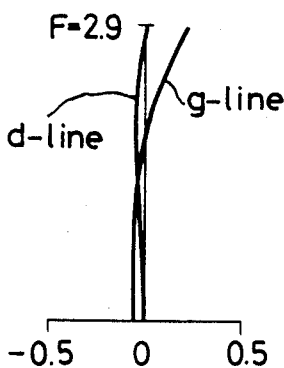
Figure 16A:
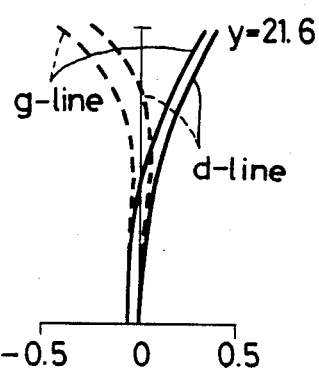
Figure 16A:
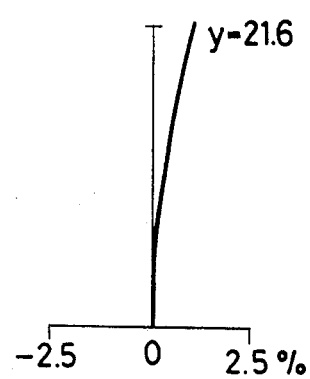
Figure 16A:
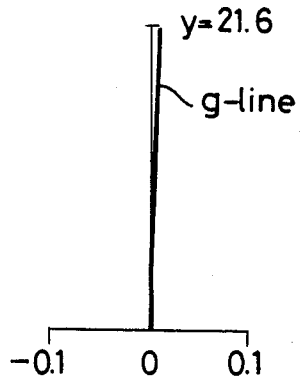
Figure 16A:
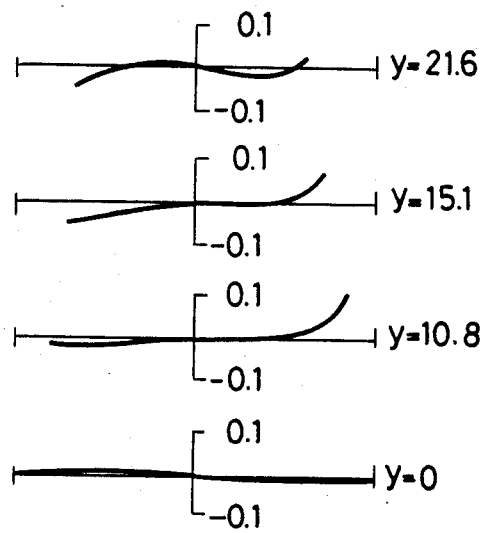
Figure 16B:
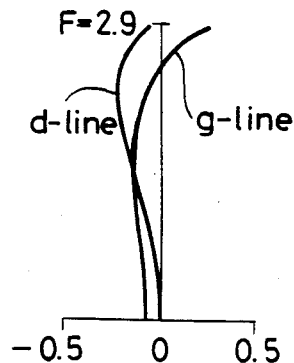
Figure 16B:
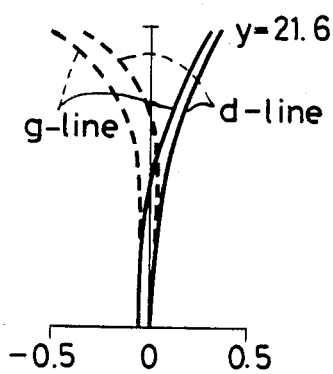
Figure 16B:
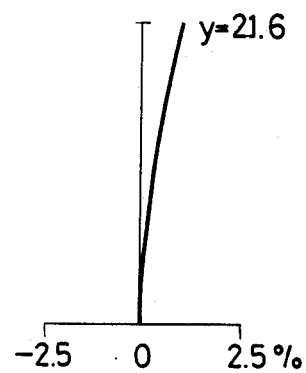
Figure 16B:
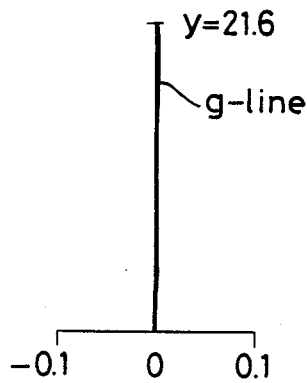
Figure 16B:
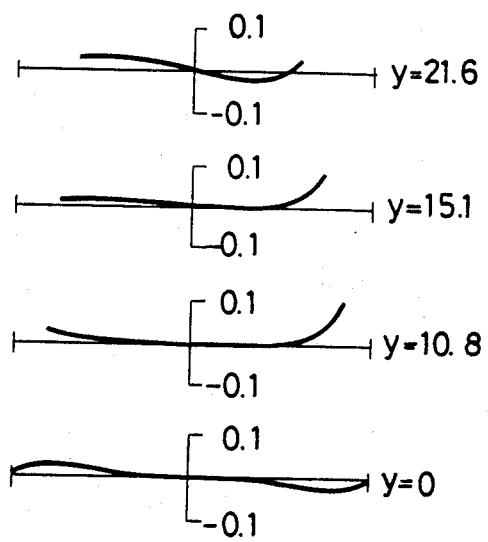
Figure 17A:
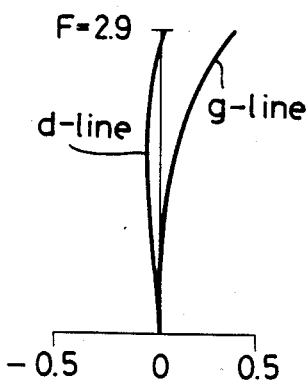
Figure 17A:
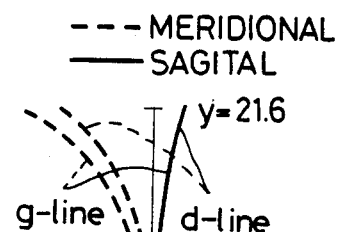
Figure 17A:
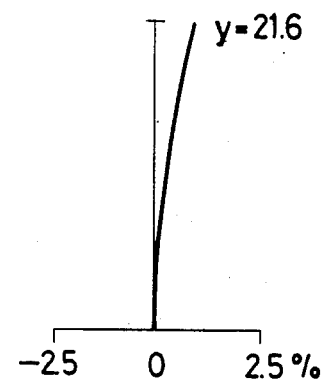
Figure 17A:
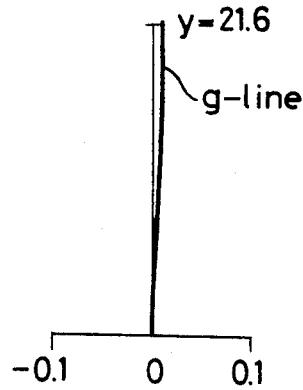
Figure 17A:
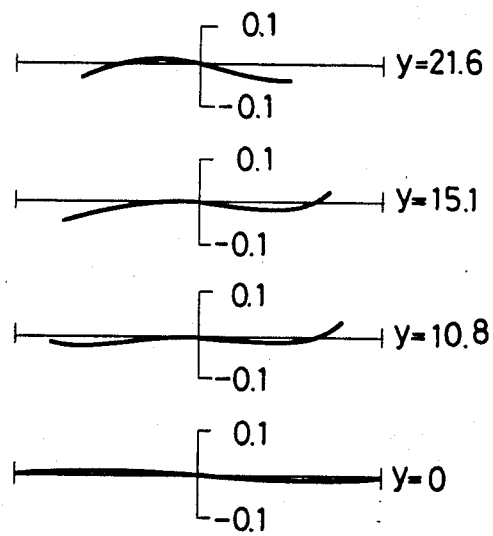
Figure 17B:
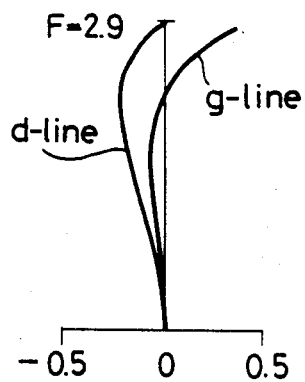
Figure 17B:
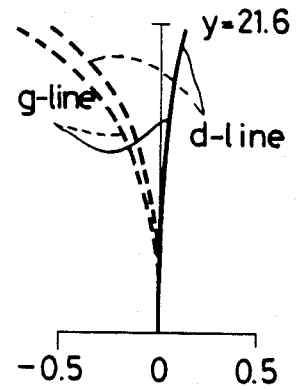
Figure 17B:
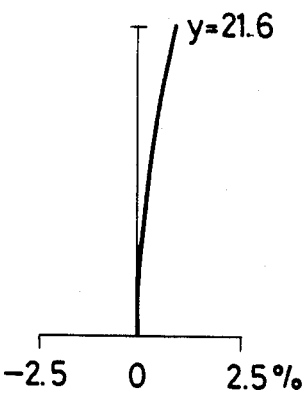
Figure 17B:
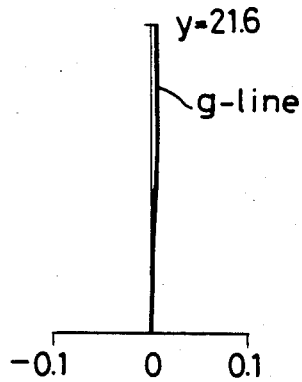
Figure 17B:
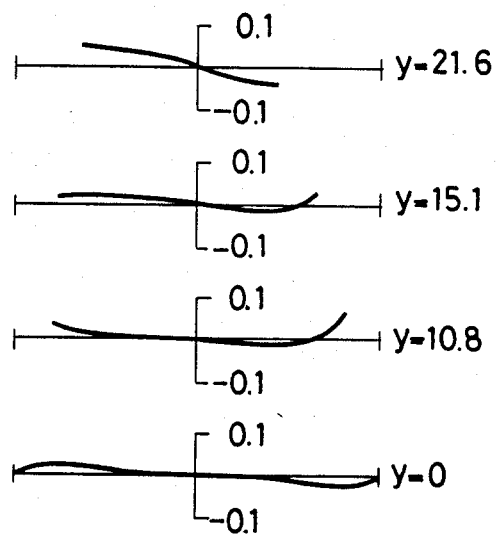

In such RFC of the second type according to the present invention, to widen the focusing-capable range as much as possible when in-focus has been accomplished with the RFC moved from infinity to a finite distance and to reduce the then aberration fluctuations, the RFC is divided into two subgroups, i.e., a forward subgroup G₁ having a negative refractive power and a rearward subgroup G₂ having a positive refractive power, as shown in FIG. 2, and the two subgroups of the RFC are moved at different speeds on the optic axis toward the camera body relative to the objective lens and the camera body, to thereby effect in-focus. More specifically, during the focusing to a shorter distance, both of the forward subgroup and the rearward subgroup are moved toward the image side and the movement speed of the forward subgroup is greater.

The form of movement of the forward subgroup of negative refractive power and the rearward subgroup of positive refractive power can be likewise expressed by the aforementioned equation (7).

In the RFC of the second type according to the present invention, a negative meniscus lens having its convex surface facing the object side is disposed as a component most adjacent to the objective lens in the forward subgroup $G_1$ having a negative refractive power and a biconvex lens is disposed on the image side thereof, whereby on-axis chromatic aberration can be easily corrected. Also, disposing a lens having a concave surface on the object side thereof through the image side convex surface and air space of this biconvex lens is very effective for the correction of the outward coma of the light ray above the principal ray at the medium angle of view and the inward coma of the light ray below the principal ray.

By constructing the forward subgroup $G_1$ from such a lens arrangement, the aberration fluctuations during the infinity in-focus and during the short distance in-focus can be made smaller than in the RFC disclosed in the inventor's prior U.S. application Ser. No. 459,980 now U.S. Pat. No. 4,591,234 wherein a positive lens is disposed most adjacent to the object side. Further, the adoption of such a lens construction and a mechanism in which, as previously described, the RFC is divided into two forward and rearward subgroups and the forward and rearward subgroups are moved toward the image side at different speeds to thereby effect focusing can reduce the aberration fluctuations.

The said conditions in the RFC of the second type according to the present invention will hereinafter be described in detail.

Condition (11) prescribes a proper distribution of the refractive power of the rearward subgroup $G_2$ relative to the forward subgroup $G_1$ of the RFC. In the range in which the magnification $\beta$ of the RFC and the distance $d_0$ from the foremost lens surface of the RFC to the image point by the objective lens are practical, if the upper limit of this condition is exceeded, spherical aberration will become excessively positive and correction thereof will become difficult, and this is unsuitable. If the lower limit of this condition is exceeded, spherical aberration will become excessively negative and sine condition will also become remarkably negative, and Petzval sum will also become negative, and this is unsuitable. Condition (12) prescribes a proper distribution of the refractive power of the rearward subgroup $G_2$ relative to the whole refractive power of the RFC. In the range in which the magnification $\beta$ of the RFC and the distance $d_0$ are practical, if the upper limit of this condition is exceeded, spherical aberration will become excessively positive, and this is unsuitable. If the lower limit of this condition is exceeded, spherical aberration will become excessively negative and distortion will also become excessive in the positive sense, and this is unsuitable. Condition (13) supplements conditions (11) and (12) and provides for proper spherical aberration.

If the upper limit of condition (14) is exceeded, aberration correction will become difficult and the number of lenses will be increased. Also, the F-number of the composite lens system will become too great and the composite lens system will become dark. Therefore, sufficient accuracy of distance measurement can only be obtained by a light objective lens, and this means the lack of versatility. If the lower limit of this condition is exceeded, when an attempt is made to effect focusing to a predetermined close distance, the amount of movement of the RFC will become too great and, on the other hand, when focusing is effected with the back focal length as a lens for a single lens reflex camera being secured, the focusing-capable area will become narrow, and this is unsuitable. If condition (15) is exceeded, it will become necessary to increase the distance $d_0$ from the vertex of the foremost lens surface of the RFC to the image point by the objective lens and the number of objective lenses to which the RFC can be mounted will become too small, and this leads to the lack of versatility and thus is unsuitable. Also, $f_R$ will become shorter and the refractive power of the RFC will become too strong and therefore, correction of astigmatism and Petzval sum will become difficult and also, the aberration fluctuations when focusing is effected to the closest distance by movement of the RFC will become greater, and again this is unsuitable. If the upper limit of condition (16) is exceeded, the lens length of the RFC will become too short and Petzval sum will become excessive in the negative sense and the degree of freedom of aberration correction will be lost. Also, $\beta$ will become too small and the photographing range in which focusing can be effected will become smaller, and this is unsuitable. If the lower limit of this condition is exceeded, the magnification will become too great and therefore, correction of astigmatism will become difficult and the number of lenses will be increased. Moreover, the lens length of the RFC will become too long, and this is unsuitable.

As regards the forms of movement of the forward subgroup $G_1$ of negative refractive power and the rearward subgroup $G_2$ of positive refractive power, it is desirable that the following conditions be satisfied with respect to the aforementioned coefficient values $\alpha_1$ and $\alpha_2$:

$$-1.6 < \alpha_1 < -1.0 \qquad (17)$$

$$0 < \alpha_2 < 0.6 \qquad (18)$$

The forward subgroup has chiefly the focusing function by being moved in the range prescribed by condition (17) and contributes to the enlargement of the photographing magnification. It is desirable that the rearward subgroup be moved relative to the forward subgroup within the range of condition (18). According to these conditions, it is possible to correct astigmatism appropriately in the negative direction and accordingly, it is possible to maintain the flatness of the image plane in conformity with the fluctuation of spherical aberration in the negative direction which is liable to occur during the short distance in-focus and achieve good balance of the various aberrations.

In the RFC of the present invention as described above, it is desirable that the following condition be further satisfied with respect to the distance $d_0$ between the vertex of the foremost lens surface of the RFC and the image point by the objective lens and the distance between the objective lens mount surface of the camera body and the film surface, i.e., the so-called flange back MB:

$$0.7 < |d_0/MB| < 0.9$$

Here, in the popular single lens reflex camera body, MB=46.5 mm.

Further, to correct Petzval sum well, it is practical to satisfy the following conditions:

$$0.6 < \beta \cdot d_0/f_R < 1.0$$

$$0.4 < d_0/f_R < 0.7$$

Some embodiments of the RFC of the second type according to the present invention will hereinafter be described. Each embodiment, like the embodiments of the first type, has been designed with the objective lens shown in Table 1 being as the standard.

As regards the specific lens construction of each embodiment of the RFC of the second type, the forward subgroup $G_1$ of negative refractive power comprises, in succession from the object side, a negative meniscus lens $L_1$ having its convex surface facing the object side and a biconvex lens $L_2$, and these two lenses may be separate from each other or cemented together, and on the image side thereof, two biconcave lenses $L_3$ and $L_5$ and a biconvex lens $L_4$ therebetween are disposed to allot the divergent refractive power as the forward subgroup to them. These three lenses in the forward subgroup may be cemented together or separate from one another. Also, instead of these three lenses, the image side component in the forward subgroup may be constituted by three lenses disposed in the order of positive, negative and positive. The rearward subgroup $G_2$ of positive refractive power may most simply be comprised of a single positive lens $L_6$ having its surface of sharper curvature facing the object side, but it is possible to further add a lens to thereby make the aberration correction advantageous.

The numerical data of twelfth to fifteenth embodiments as the embodiments of the RFC of the second type according to the present invention will be shown in Tables 13 to 16 below. In each of these tables, R and r represent the radius of curvature of each lens surface, d represents the center thickness and air space of each lens, n represents the refractive index of each lens, $\nu$ represents the Abbe number of each lens, and the subscript numbers represent the order from the object side. However, in Tables 13 to 16, $d_0$ represents the distance between the foremost lens surface of the RFC and the image point by the objective lens, $D_0$ represents the distance from the foremost lens surface of the objective lens to the object point, $D_1$ represents the air space between the objective lens and the RFC, $f_1$ represents the focal length of the forward subgroup $G_1$ of the RFC, and $f_2$ represents the focal length of the rearward subgroup $G_2$ of the RFC. $B_f$ represents the back focal length of the composite system of the RFC and the standard objective lens, $\Delta B_f$ represents the amount of variation in the back focal length during the infinity in-focus and the close distance in-focus by the RFC, F represents the combined focal length of the RFC and the objective lens, and M represents the photography magnification of the composite system.

TABLE 13

(Twelfth Embodiment)

Magnification: $\beta = 1.6$   Focal length $f_R = -69.793$

| No. | Radius of curvature r | Center thickness and air space of lens d | Refractive index n | Abbe number $\nu$ | |
|---|---|---|---|---|---|
| | (G$_1$) | | | | |
| 1 | 68.990 | 0.900 | 1.87739 | 38.1 | L$_1$ |
| 2 | 30.885 | 0.300 | | | |
| 3 | 33.000 | 4.000 | 1.59507 | 35.5 | L$_2$ |
| 4 | −46.188 | 2.000 | | | |
| 5 | −52.483 | 0.900 | 1.84042 | 43.3 | L$_3$ |
| 6 | 50.000 | 3.000 | 1.59507 | 35.5 | L$_4$ |
| 7 | −56.254 | 0.500 | | | |
| 8 | −40.076 | 0.900 | 1.84042 | 43.3 | L$_5$ |
| 9 | 129.420 | 1.500 | | | |
| | (G$_2$) | | | | |
| 10 | 47.600 | 2.300 | 1.51454 | 54.6 | L$_6$ |
| 11 | 131.533 | | | | |

| F = 82.560 | | M = −0.045 | |
|---|---|---|---|
| $D_0$ | ∞ | | 1821.478 |
| $D_1$ | 1.0 | | 3.242 |
| $D_2$ | 1.5 | | 0.827 |
| $B_f$ | 40.269 | | 38.700 |

$d_0 = -36.605$
$f_1 = -47.136$
$f_2 = 143.637$
$\Delta B_f = -1.569$
$\alpha_1 = -1.429$
$\alpha_2 = 0.429$

TABLE 14

(Thirteenth Embodiment)

Magnification: $\beta = 1.6$   Focal length $f_R = -69.913$

| No. | Radius of curvature r | Center thickness and air space of lens d | Refractive index n | Abbe number $\nu$ | |
|---|---|---|---|---|---|
| | (G$_1$) | | | | |
| 1 | 52.700 | 0.900 | 1.87739 | 38.1 | L$_1$ |
| 2 | 30.687 | 0.700 | | | |
| 3 | 41.025 | 4.000 | 1.59507 | 35.5 | L$_2$ |
| 4 | −44.500 | 2.000 | | | |
| 5 | −43.856 | 0.900 | 1.84042 | 43.3 | L$_3$ |
| 6 | 50.000 | 4.000 | 1.59507 | 35.5 | L$_4$ |
| 7 | −33.323 | 0.900 | 1.84042 | 43.3 | L$_5$ |
| 8 | 114.991 | 1.200 | | | |
| | (G$_2$) | | | | |
| 9 | 36.900 | 2.000 | 1.48749 | 70.2 | L$_6$ |
| 10 | 80.598 | | | | |

| F = 82.560 | | M = −0.040 | |
|---|---|---|---|
| $D_0$ | ∞ | | 2051.199 |
| $D_1$ | 1.0 | | 2.978 |
| $D_2$ | 1.2 | | 0.607 |
| $B_f$ | 40.297 | | 38.913 |

$d_0 = -36.605$
$f_1 = -46.531$
$f_2 = 137.548$
$\Delta B_f = -1.384$
$\alpha_1 = -1.429$
$\alpha_2 = 0.429$

TABLE 15

(Fourteenth Embodiment)

Magnification: $\beta = 1.6$   Focal length $f_R = -68.563$

| No. | Radius of curvature r | Center thickness and air space of lens d | Refractive index n | Abbe number $\nu$ | |
|---|---|---|---|---|---|
| | (G$_1$) | | | | |
| 1 | 73.948 | 0.900 | 1.84042 | 43.3 | L$_1$ |
| 2 | 25.000 | 5.000 | 1.60342 | 38.1 | L$_2$ |
| 3 | −44.818 | 1.500 | | | |
| 4 | −58.042 | 0.900 | 1.84042 | 43.3 | L$_3$ |
| 5 | 43.000 | 3.500 | 1.60342 | 38.1 | L$_4$ |
| 6 | −54.418 | 0.800 | | | |

TABLE 15-continued (Fourteenth Embodiment)

Magnification: $\beta = 1.6$   Focal length $f_R = -68.563$

| | | | | | |
|---|---|---|---|---|---|
| 7 | −35.580 | 0.900 | 1.84042 | 43.3 | $L_5$ |
| 8 | 129.420 | 1.000 | | | |
| | ($G_2$) | | | | |
| 9 | 45.991 | 2.300 | 1.51118 | 50.9 | $L_6$ |
| 10 | 161.464 | | | | |

| F = 82.560 | M = −0.045 |
|---|---|
| $D_0$  ∞ | 1818.930 |
| $D_1$  1.0 | 3.383 |
| $D_2$  1.0 | 0.762 |
| $B_f$  40.040 | 37.895 |

$d_0 = -36.605$
$f_1 = -44.506$
$f_2 = 124.962$
$\Delta B_f = -2.145$
$\alpha_1 = -1.111$
$\alpha_2 = 0.111$

TABLE 16

(Fifteenth Embodiment)

Magnification: $\beta = 1.6$   Focal length $f_R = -68.406$

| No. | Radius of curvature r | Center thickness and air space of lens d | Refractive index n | Abbe number ν | |
|---|---|---|---|---|---|
| | ($G_1$) | | | | |
| 1 | 64.650 | 0.900 | 1.84042 | 43.3 | $L_1$ |
| 2 | 22.093 | 5.000 | 1.60342 | 38.1 | $L_2$ |
| 3 | −43.789 | 2.000 | | | |
| 4 | −41.677 | 0.900 | 1.84042 | 43.3 | $L_3$ |
| 5 | 43.000 | 3.500 | 1.60342 | 38.1 | $L_4$ |
| 6 | −50.000 | 0.900 | 1.84042 | 43.3 | $L_5$ |
| 7 | 115.188 | 1.000 | | | |
| | ($G_2$) | | | | |
| 8 | 36.434 | 2.300 | 1.51454 | 54.6 | $L_6$ |
| 9 | 61.936 | | | | |

| F = 82.561 | M = −0.045 |
|---|---|
| $D_0$  ∞ | 1818.574 |
| $D_1$  1.0 | 3.399 |
| $D_2$  1.0 | 0.760 |
| $B_f$  40.285 | 38.125 |

Figure 27:
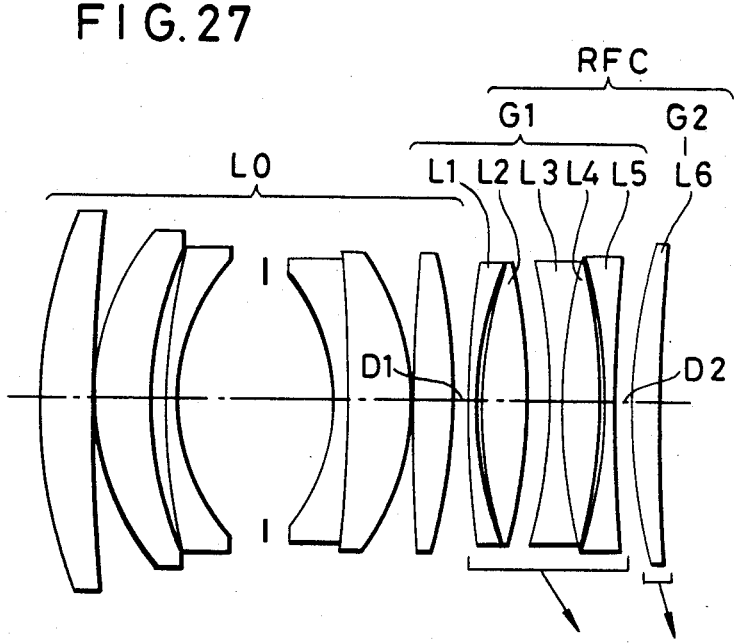
FIG. 27 shows the lens construction in the infinity in-focus state in which the RFC according to a twelfth embodiment of the present invention is mounted to the standard objective lens.
Figure 28:
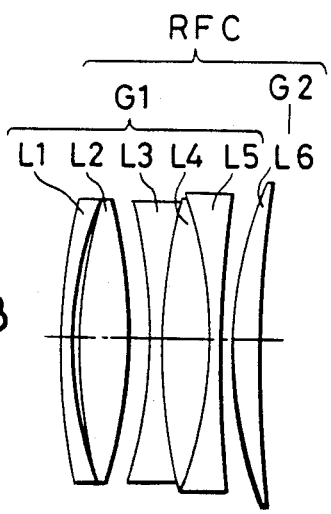
FIGS. 28 to 30 show the lens constructions of twelfth to fifteenth embodiments of the RFC according to the present invention.
Figure 29:
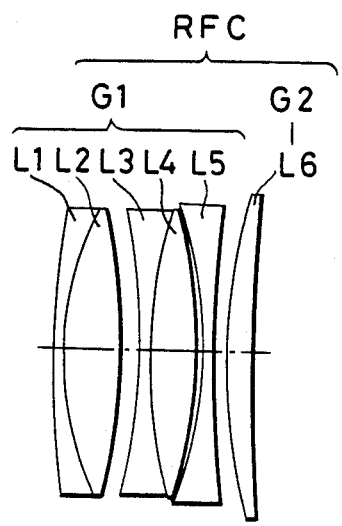
Figure 30:
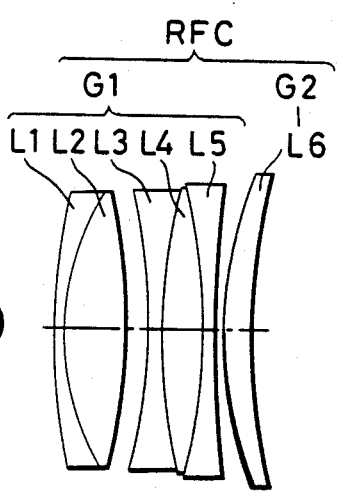
Figure 31A:
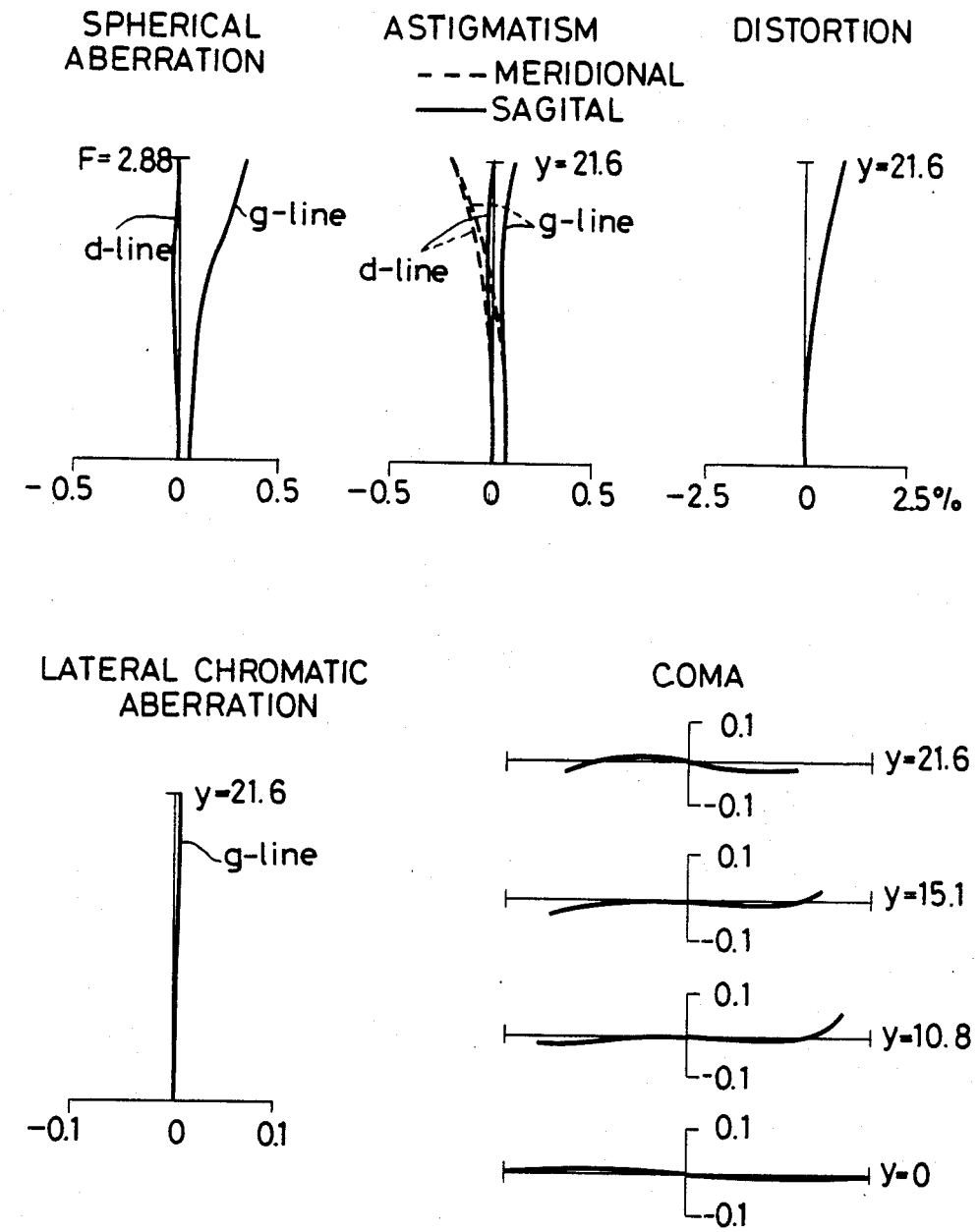
Figure 31B:
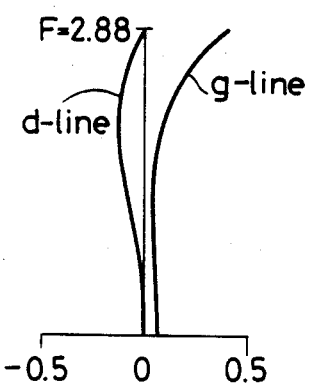
Figure 31B:
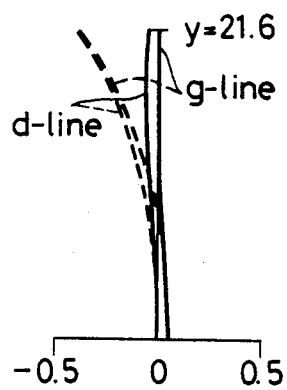
Figure 31B:
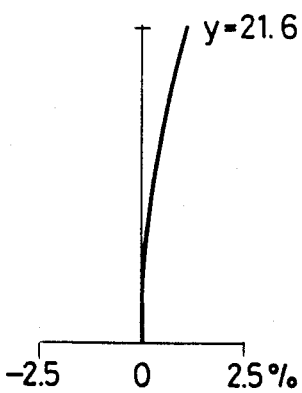
Figure 31B:
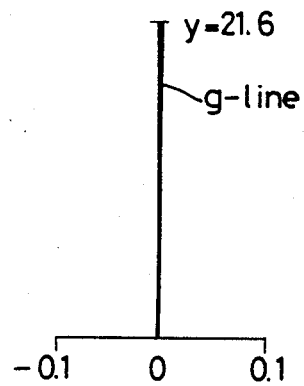
Figure 31B:
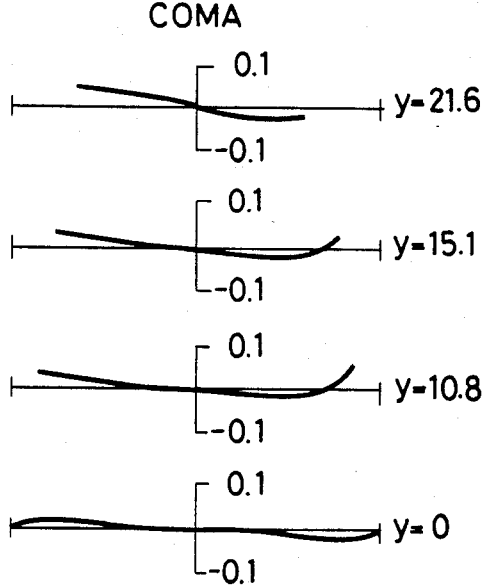
Figure 32A:
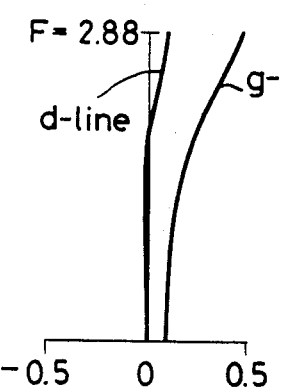
Figure 32A:
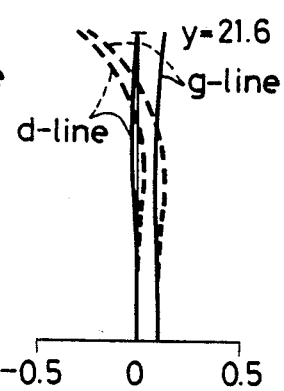
Figure 32A:
Figure 32A:
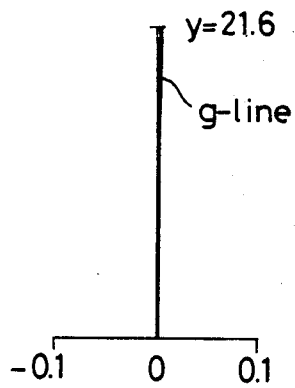
Figure 32A:
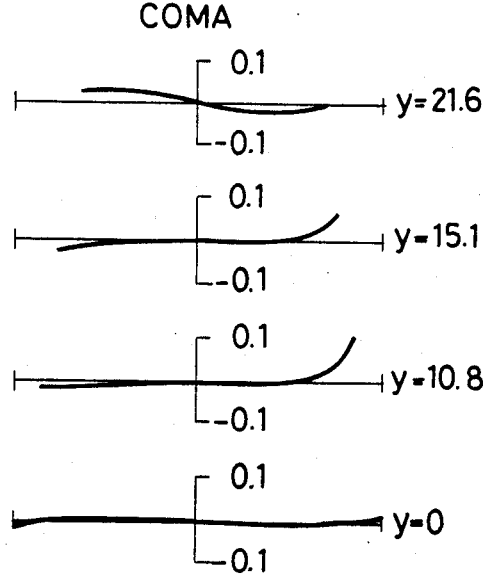
Figure 32B:
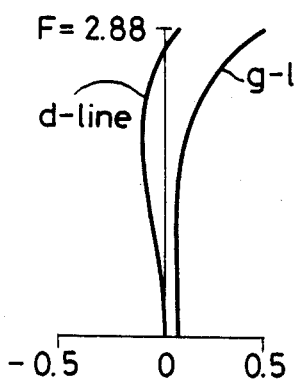
Figure 32B:
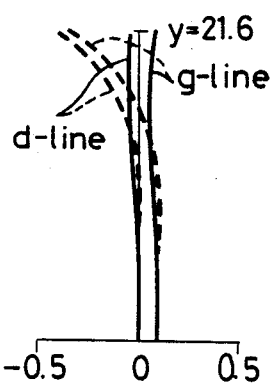
Figure 32B:
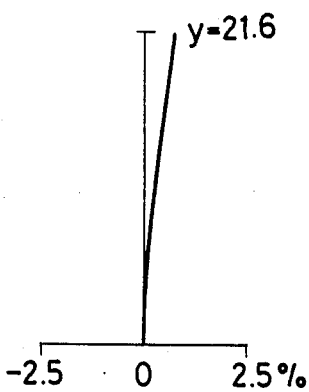
Figure 32B:
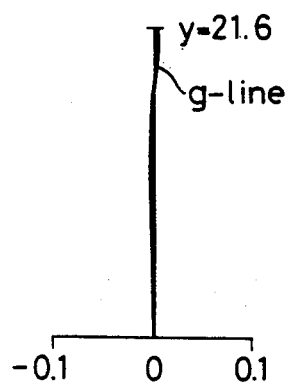
Figure 32B:
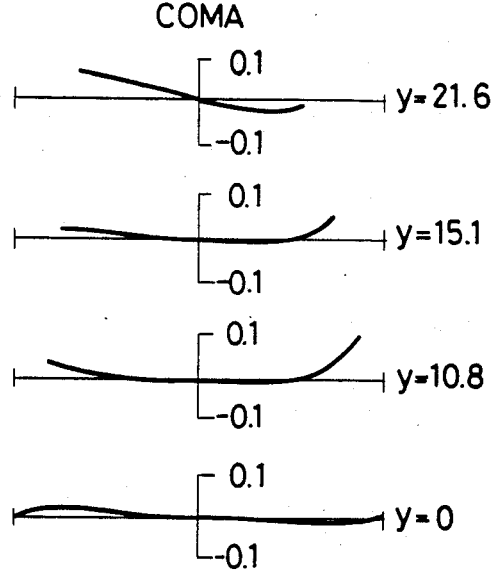
Figure 33A:
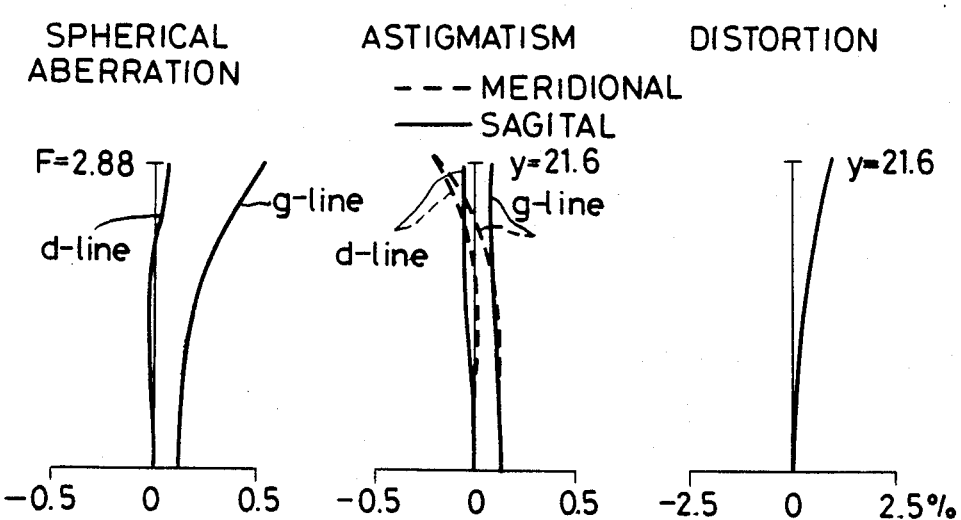
Figure 33A:
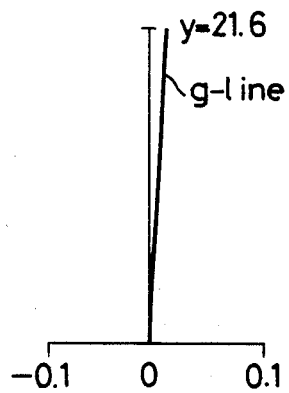
Figure 33A:
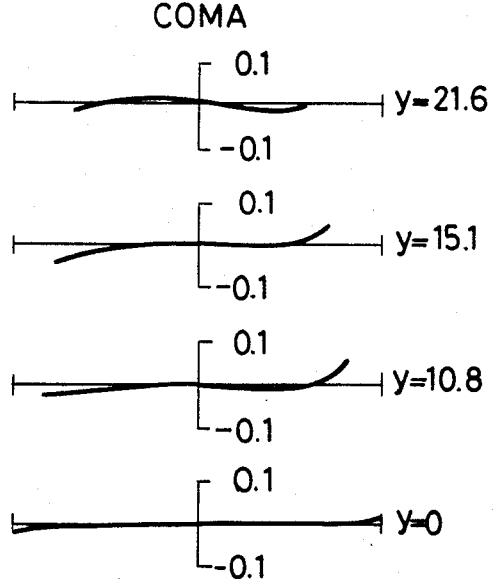
Figure 33B:
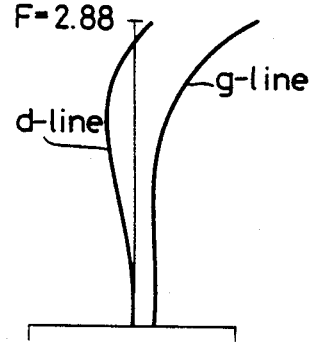
Figure 33B:
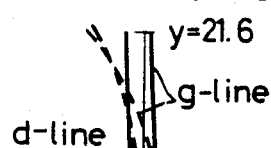
Figure 33B:
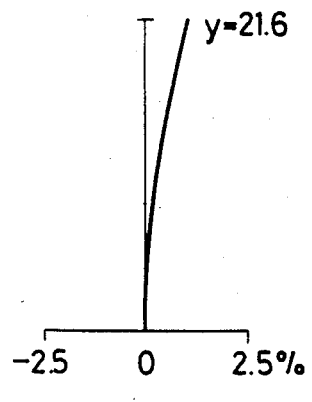
Figure 33B:
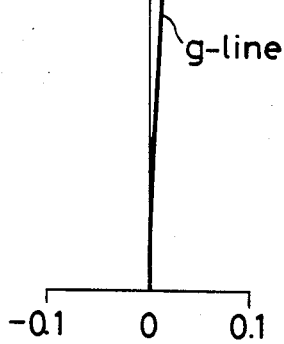
Figure 33B:
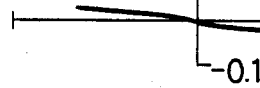
Figure 33B:
Figure 33B:
Figure 33B:
Figure 34A:
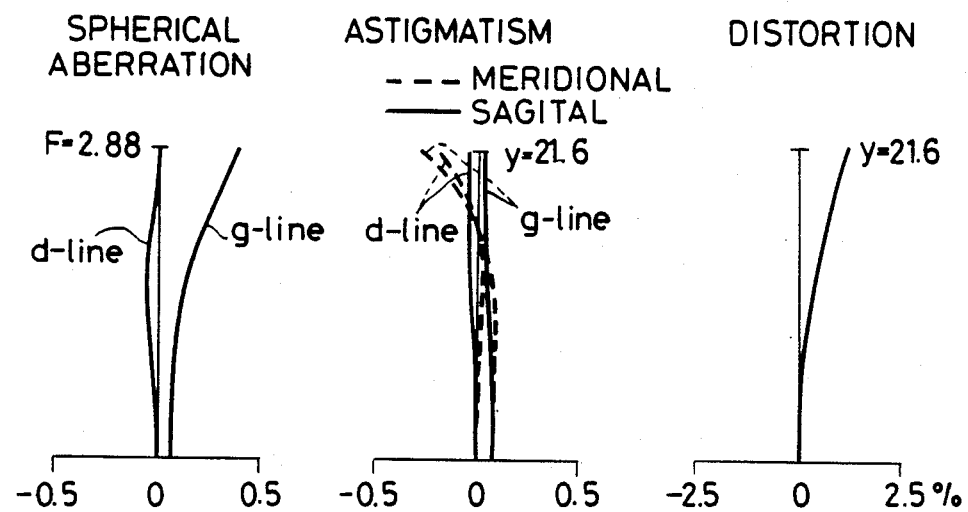
Figure 34A:
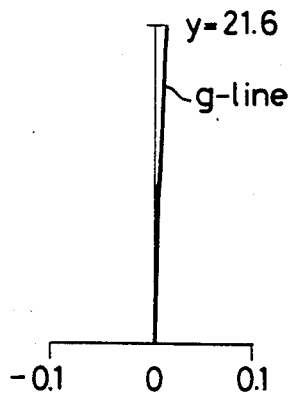
Figure 34A:
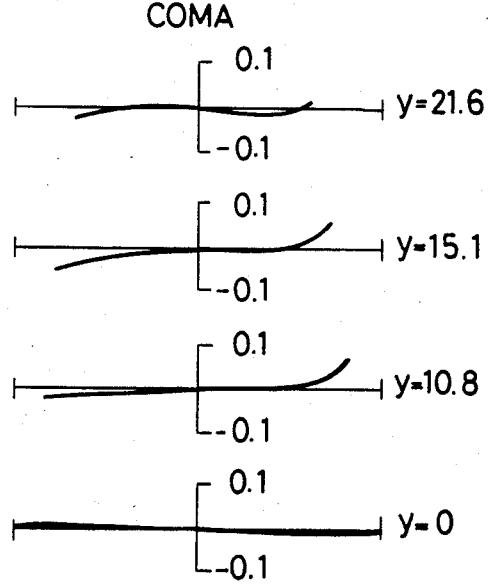
Figure 34B:
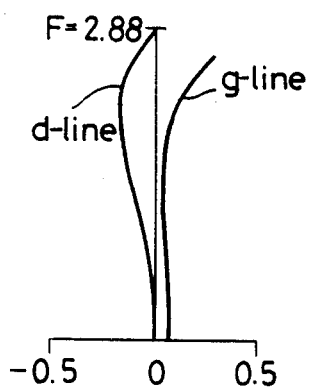
Figure 34B:
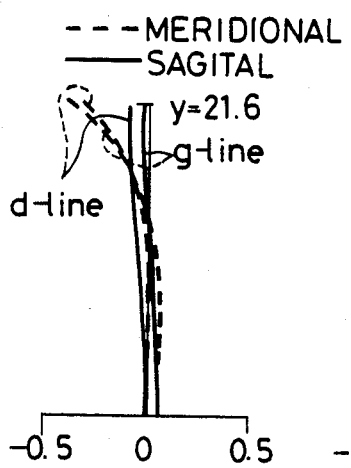
Figure 34B:
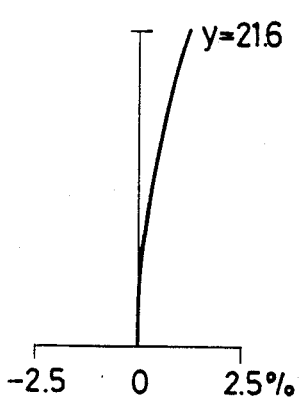
Figure 34B:
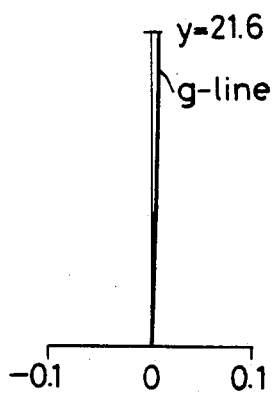
Figure 34B:
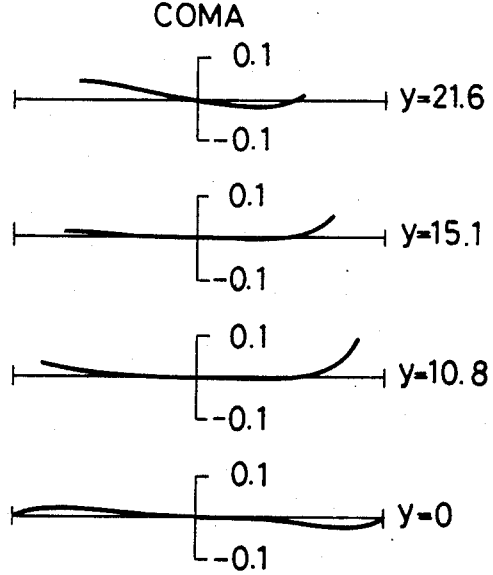

$d_0 = -36.605$
$f_1 = -49.105$
$f_2 = 166.859$
$\Delta B_f = -2.160$
$\alpha_1 = -1.111$
$\alpha_2 = 0.111$ The lens constructions of the twelfth to fifteenth embodiments are shown in FIGS. 27 to 30, respectively. In FIG. 27 which shows the lens construction of the twelfth embodiments, there is also shown the lens construction of the standard objective lens $L_0$ of Table 1.

The various aberrations when the RFC's of the twelfth to fifteenth embodiments are mounted to the standard objective lens shown in Table 1 are shown in FIGS. 31A, 31B to FIGS. 34A, 34B. A of these Figures shows the various aberrations during the infinity in-focus in which each RFC is mounted, and B of these Figures shows the various aberrations when each RFC is mounted and focusing is effected to the close distance by the RFC. In these aberration graphs, there are shown spherical aberration, astigmatism, distortion, lateral chromatic aberration of g-line (λ=435.8 nm) for the standard wavelength d-line (λ=587.6 nm), and coma.

From these aberration graphs, it is apparent that the RFC of the second type according to the present invention also maintains a practically sufficiently good imaging performance from infinity to the short distance. Each of these embodiments can be mounted not only to the standard objective lens shown in Table 1 but also to other various objective lenses and can accomplish focusing from infinity to a predetermined short distance while maintaining an excellent imaging performance in a similar manner.

Thus, the RFC according to the present invention can be versatilely mounted to all objective lenses and is compact and yet has an excellent performance from infinity to the short distance. If the RFC is combined with an automatic focusing device, focusing can be accomplished relative to all objective lenses by movement of the RFC and therefore, the focusing machanism will become common and even if the objective lens is interchanged, the focusing mechanism need not be interchanged, and this is very convenient.

What is claimed is:

1. A rear conversion lens apparatus mounted between an objective lens and a camera body for enlarging the focal length of the composite system of the rear conversion lens and the objective lens more than the focal length of said objective lens, said rear conversion lens apparatus including:
   a converter barrel removably mounted between said objective lens and said camera body;
   a lens group of negative refractive power movable along the optic axis within said converter barrel;
   said lens group of negative refractive power having a forward subgroup and a rearward subgroup, said forward subgroup having a negative meniscus lens disposed most adjacent to the object side and having its convex surface facing the object side and a positive lens disposed on the image side of said negative meniscus lens; and
   moving means for moving said lens group of negative refractive power along the optic axis;
   focusing to objects at infinity to a short distance being effected by the movement of said negative lens group by said moving means.

2. A rear conversion lens apparatus according to claim 1, wherein said forward subgroup has a negative refractive power, said rearward subgroup has a positive refractive power, and said two subgroups are movable along the optic axis at different speeds.

3. A rear conversion lens apparatus according to claim 2, satisfying the following conditions:

$0.2 < |f_1/f_2| < 0.5$  (11)

$0.3 < |f_R/f_2| < 1.6$  (12)

$0.6 < |f_R/f_1| < 1.8$  (13)

$1.3 < \beta < 2.5$  (14)

$|\Delta B_f/f_R| < 0.2$  (15)

$0.4 < |B_f/d_0\beta| < 0.9$  (16)

where $\beta$ is the enlargement magnification of the focal length of the objective lens in the infinity in-focus state, $\Delta B_f$ is the amount of variation in the combined back focal length $B_f$ when focusing is effected to infinity to a predetermined short distance, $f_R$ is the focal length of the rear conversion lens apparatus, $d_0$ is the distance from the vertex of the lens surface of the rear conversion lens apparatus which is most adjacent to the object side to the image point by said objective lens, and $f_1$ and $f_2$ are the focal lengths of said forward subgroup and said rearward subgroup, respectively.

4. A rear conversion lens apparatus according to claim 3, satisfying the following conditions:

$$-1.6 < \alpha_1 < -1.0 \quad (17)$$

$$0 < \alpha_2 < 0.6 \quad (18)$$

where $\alpha_1$ and $\alpha_2$ are the rates of variation of the amount of variation $\Delta D_1$ in the spacing between said objective lens and said forward subgroup during the infinity in-focus to the finite distance in-focus and the amount of variation $\Delta D_2$ in the spacing between said forward subgroup and said rearward subgroup, respectively, to the amount of variation $\Delta B_f$ in the combined back focal length of said objective lens and said rear conversion lens apparatus, and $\alpha$ is defined as $\alpha = \alpha_1 + \alpha_2 + 1$.

5. A rear conversion lens apparatus according to claim 3, wherein said camera body has a lens mount surface and a surface on which a film is disposed, and the following condition is satisfied:

$$0.7 < |d_0/MB| < 0.9,$$

where $d_0$ is the distance between the vertex of the lens surface of said negative lens group which is most adjacent to the object side and the image point by said objective lens, and MB is the distance between the lens mount surface of said camera body and the surface of said film.

6. A rear conversion lens apparatus according to claim 3, further satisfying the following conditions:

$$0.6 < \beta \cdot d_0/f_R < 1.0$$

$$0.4 < d_0/f_R < 0.7.$$

7. A rear conversion lens apparatus according to claim 3, wherein numerical data are as follows:
Magnification: $\beta = 1.6$ Focal length $f_R = -69.793$

| No. | Radius of curvature r | Center thickness and air space of lens d | Refractive index n | Abbe number $\nu$ | |
|---|---|---|---|---|---|
| | (G₁) | | | | |
| 1 | 68.990 | 0.900 | 1.87739 | 38.1 | L₁ |
| 2 | 30.885 | 0.300 | | | |
| 3 | 33.000 | 4.000 | 1.59507 | 35.5 | L₂ |
| 4 | −46.188 | 2.000 | | | |
| 5 | −52.483 | 0.900 | 1.84042 | 43.3 | L₃ |
| 6 | 50.000 | 3.000 | 1.59507 | 35.5 | L₄ |
| 7 | −56.254 | 0.500 | | | |
| 8 | −40.076 | 0.900 | 1.84042 | 43.3 | L₅ |
| 9 | 129.420 | 1.500 | | | |
| | (G₂) | | | | |
| 10 | 47.600 | 2.300 | 1.51454 | 54.6 | L₆ |
| 11 | 131.533 | | | | |

| F = 82.560 | | M = −0.045 |
|---|---|---|
| D₀ | ∞ | 1821.478 |
| D₁ | 1.0 | 3.242 |
| D₂ | 1.5 | 0.827 |
| B_f | 40.269 | 38.700 |

$d_0 = -36.605$
$f_1 = -47.136$
$f_2 = 143.637$
$\Delta B_f = -1.569$
$\alpha_1 = -1.429$
$\alpha_2 = 0.429$ where R and r represent the radius of curvature of each lens surface, d represents the center thickness and air space of each lens, n represents the refractive index of each lens, $\nu$ represents the Abbe number of each lens, the subscript numbers represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus $f_1$ represents the focal length of the forward subgroup of the rear conversion lens apparatus, $f_2$ represents the focal length of the rearward group of the rear conversion lens apparatus, $B_f$ represents the back focal length of the composite system of the rear conversion lens apparatus and the objective lens, $\Delta_{Bf}$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

8. A rear conversion lens apparatus according to claim 3, wherein numerical data are as follows:
Magnification: $\beta = 1.6$ Focal length $f_R = -69.913$

| No. | Radius of curvature r | Center thickness and air space of lens d | Refractive index n | Abbe number $\nu$ | |
|---|---|---|---|---|---|
| | (G₁) | | | | |
| 1 | 52.700 | 0.900 | 1.87739 | 38.1 | L₁ |
| 2 | 30.687 | 0.700 | | | |
| 3 | 41.025 | 4.000 | 1.59507 | 35.5 | L₂ |
| 4 | −44.500 | 2.000 | | | |
| 5 | −43.856 | 0.900 | 1.84042 | 43.3 | L₃ |
| 6 | 50.000 | 4.000 | 1.59507 | 35.5 | L₄ |
| 7 | −33.323 | 0.900 | 1.84042 | 43.3 | L₅ |
| 8 | 114.991 | 1.200 | | | |
| | (G₂) | | | | |
| 9 | 36.900 | 2.000 | 1.48749 | 70.2 | L₆ |
| 10 | 80.598 | | | | |

| F = 82.560 | | M = −0.040 |
|---|---|---|
| D₀ | ∞ | 2051.199 |
| D₁ | 1.0 | 2.978 |
| D₂ | 1.2 | 0.607 |
| B_f | 40.297 | 38.913 |

$d_0 = -36.605$
$f_1 = -46.531$
$f_2 = 137.548$
$\Delta B_f = -1.384$
$\alpha_1 = -1.429$
$\alpha_2 = 0.429$ where R and r represent the radius of curvature of each lens surface, d represents the center thickness and air space of each lens, n represents the refractive index of each lens, $\nu$ represents the Abbe number of each lens, the subscript numbers represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward group of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

9. A rear conversion lens apparatus according to claim 3, wherein numerical data are as follows:
Magnification: $\beta = 1.6$ Focal length $f_R = -68.563$

| No. | Radius of curvature r | Center thickness and air space of lens d | Refractive index n | Abbe number $\nu$ | |
|---|---|---|---|---|---|
| | (G$_1$) | | | | |
| 1 | 73.948 | 0.900 | 1.84042 | 43.3 | L$_1$ |
| 2 | 25.000 | 5.000 | 1.60342 | 38.1 | L$_2$ |
| 3 | −44.818 | 1.500 | | | |
| 4 | −58.042 | 0.900 | 1.84042 | 43.3 | L$_3$ |
| 5 | 43.000 | 3.500 | 1.60342 | 38.1 | L$_4$ |
| 6 | −54.418 | 0.800 | | | |
| 7 | −35.580 | 0.900 | 1.84042 | 43.3 | L$_5$ |
| 8 | 129.420 | 1.000 | | | |
| | (G$_2$) | | | | |
| 9 | 45.991 | 2.300 | 1.51118 | 50.9 | L$_6$ |
| 10 | 161.464 | | | | |

| | F = 82.560 | M = −0.045 |
|---|---|---|
| D$_0$ | ∞ | 1818.930 |
| D$_1$ | 1.0 | 3.383 |
| D$_2$ | 1.0 | 0.762 |
| B$_f$ | 40.040 | 37.895 |

$d_0 = -36.605$
$f_1 = -44.506$
$f_2 = 124.962$
$\Delta B_f = -2.145$
$\alpha_1 = -1.111$
$\alpha_2 = 0.111$ where R and r represent the radius of curvature of each lens surface, d represents the center thickness and air space of each lens, n represents the refractive index of each lens, $\nu$ represents the Abbe number of each lens, the subscript numbers represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward group of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

10. A rear conversion lens apparatus according to claim 3, wherein numerical data are as follows:
Magnification: $\beta = 1.6$ Focal length $f_R = -68.406$

| No. | r | d | n | $\nu$ | |
|---|---|---|---|---|---|
| | (G$_1$) | | | | |
| 1 | 64.650 | 0.900 | 1.84042 | 43.3 | L$_1$ |
| 2 | 22.093 | 5.000 | 1.60342 | 38.1 | L$_2$ |
| 3 | −43.789 | 2.000 | | | |
| 4 | −41.677 | 0.900 | 1.84042 | 43.3 | L$_3$ |
| 5 | 43.000 | 3.500 | 1.60342 | 38.1 | L$_4$ |
| 6 | −50.000 | 0.900 | 1.84042 | 43.3 | L$_5$ |
| 7 | 115.188 | 1.000 | | | |
| | (G$_2$) | | | | |
| 8 | 36.434 | 2.300 | 1.51454 | 54.6 | L$_6$ |
| 9 | 61.936 | | | | |

| | F = 82.561 | M = −0.045 |
|---|---|---|
| D$_0$ | ∞ | 1818.574 |
| D$_1$ | 1.0 | 3.399 |
| D$_2$ | 1.0 | 0.760 |
| B$_f$ | 40.285 | 38.125 |

$d_0 = -36.605$
$f_1 = -49.105$
$f_2 = 166.859$
$\Delta B_f = -2.160$
$\alpha_1 = -1.111$
$\alpha_2 = 0.111$ where R and r represent the radius of curvature of each lens surface, d represents the center thickness and air space of each lens, n represents the refractive index of each lens, $\nu$ represents the Abbe number of each lens, the subscript numbers represent the order from the object side, $d_0$ represents the distance between the foremost lens surface of the rear conversion lens apparatus and the image point by the ojective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward group of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

11. A rear conversion lens apparatus according to claim 1, wherein said forward subgroup has a positive refractive power and said rearward subgroup has a negative refractive power.

12. A rear conversion lens apparatus according to claim 11, satisfying the following conditions:

$$1.3 < \beta < 2.5 \tag{1}$$

$$|\Delta B_f / f_R| < 0.2 \tag{2}$$

$$0.4 < |B_f / d_0 \cdot \beta| < 0.9 \tag{3}$$

$$-2.0 < f_2 / f_1 < -0.31 \tag{4}$$

$$0.6 < |f_1 / f_R| < 1.8 \tag{5}$$

$$0.3 < |f_2 / f_R| < 0.6 \tag{6}$$

where $\beta$ is the enlargement magnification of the focal length in the infinity in-focus state, $\Delta B_f$ is the amount of variation in the composite back focal length $B_f$ when focusing is effected to infinity to a predetermined short distance, $f_R$ is the focal length of said rear conversion lens, $d_0$ is the distance from the vertex of the lens surface of said rear conversion lens apparatus which is most adjacent to the object side to the image point by said objective lens, and $f_1$ and $f_2$ are the focal lengths of said forward subgroup and said rearward subgroup, respectively.

13. A rear conversion lens apparatus according to claim 12, further satisfying the following condition:

$$-0.6 < f_2/f_1 < -0.31.$$

14. A rear conversion lens apparatus according to claim 12, wherein said camera body has a lens mount surface and a surface on which a film is disposed, and the following condition is satisfied:

$$0.7 < |d_0/MB| < 0.9,$$

where $d_0$ is the distance between the vertex of the lens surface of said negative lens group which is most adjacent to the object side and the image point by said objective lens, and MB is the distance between the lens mount surface of said camera body and the surface of said film.

15. A rear conversion lens apparatus according to claim 12, further satisfying the following conditions:

$$0.6 < \beta \cdot d_0/f_R < 1.0$$

$$0.4 < d_0/f_R < 0.7.$$

16. A rear conversion lens apparatus according to claim 12, wherein numerical data are as follows:
Magnification: $\beta = 1.6$ Focal length $f_R = -68.833$

| No. | Radius of curvature r | Center thickness and air space of lens d | Refractive index n | Abbe number ν |
|---|---|---|---|---|
| | (G₁) | | | |
| 1 | 83.096 | 1.0 | 1.87739 | 38.1 |
| 2 | 30.748 | 0.3 | | |
| 3 | 33.000 | 4.0 | 1.59507 | 35.5 |
| 4 | −50.075 | 3.0 | | |
| | (G₂) | | | |
| 5 | −47.917 | 1.0 | 1.84042 | 43.3 |
| 6 | 50.000 | 3.0 | 1.59507 | 35.5 |
| 7 | −56.281 | 0.5 | | |
| 8 | −46.820 | 1.0 | 1.84042 | 43.3 |
| 9 | 129.553 | 0.2 | | |
| 10 | 46.047 | 2.5 | 1.51118 | 50.9 |
| 11 | 219.390 | | | |
| | F = 82.56 | | M = −0.035 | |
| D₀ | ∞ | | 2342.301 | |
| D₁ | 1.0 | | 2.91 | |
| B_f | 40.134 | | 38.228 | |

$$d_0 = -36.605$$
$$f_1 = 82.740$$
$$f_2 = -35.800$$
$$\Delta B_f = -1.906$$

where the numbers at the left end represent the order from the object side, $d_0$ represents the distance between the foremost lens surface of the rear conversion lens apparatus and the image point by the objective lens, D₀ represents the distance from the foremost lens surface of the objective lens to the object point, D₁ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

17. A rear conversion lens apparatus according to claim 12, wherein numerical data are as follows:
Magnification: $\beta = 1.6$ Focal length $f_R = 71.029$

| No. | Radius of curvature r | Center thickness and air space of lens d | Refractive index n | Abbe number ν |
|---|---|---|---|---|
| | (G₁) | | | |
| 1 | 87.706 | 1.0 | 1.87739 | 38.1 |
| 2 | 30.000 | 4.0 | 1.59507 | 35.5 |
| 3 | −43.691 | 2.5 | | |
| | (G₂) | | | |
| 4 | −40.754 | 1.0 | 1.84042 | 43.3 |
| 5 | 47.000 | 3.0 | 1.59507 | 35.5 |
| 6 | −54.708 | 0.5 | | |
| 7 | −46.820 | 1.0 | 1.80411 | 46.4 |
| 8 | 110.808 | 0.2 | | |
| 9 | 49.000 | 2.5 | 1.48749 | 70.2 |
| 10 | 22415.489 | | | |
| | F = 82.56 | | M = −0.045 | |
| D₀ | ∞ | | 1819.096 | |
| D₁ | 1.0 | | 3.47 | |
| B_f | 41.319 | | 38.850 | |

$$d = -36.605$$
$$f_1 = 70.578$$
$$f_2 = -33.646$$
$$\Delta B_f = -2.469$$

where the numbers at the left end represent the order from the object side, $d_0$ represents the distance between the foremost lens surface of the rear conversion lens apparatus and the image point by the objective lens, D₀ represents the distance from the foremost lens surface of the objective lens to the object point, D₁ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

18. A rear conversion lens apparatus according to claim 12, wherein numerical data are as follows:
Magnification: $\beta = 1.6$ Focal length $f_R = -70.098$

| No. | Radius of curvature r | Center thickness and air space of lens d | Refractive index n | Abbe number ν |
|---|---|---|---|---|
| | (G₁) | | | |
| 1 | 72.878 | 1.0 | 1.87739 | 38.1 |
| 2 | 30.085 | 0.3 | | |
| 3 | 33.000 | 4.0 | 1.59507 | 35.5 |

-continued

| | | | | |
|---|---|---|---|---|
| 4 | −43.959 | 1.5 | | |
| | (G$_2$) | | | |
| 5 | −50.742 | 1.0 | 1.84042 | 43.3 |
| 6 | 50.000 | 3.0 | 1.59507 | 35.5 |
| 7 | −56.281 | 1.5 | | |
| 8 | −39.016 | 1.0 | 1.84042 | 43.3 |
| 9 | 129.553 | 0.2 | | |
| 10 | 46.000 | 2.5 | 1.51118 | 50.9 |
| 11 | 282.114 | | | |

| F = 82.56 | | M = −0.040 |
|---|---|---|
| D$_0$ | ∞ | 2048.036 |
| D$_1$ | 1.0 | 3.187 |
| B$_f$ | 40.979 | 38.792 |

$d_0 = -36.605$
$f_1 = 68.711$
$f_2 = -32.980$
$\Delta B_f = -2.187$ where the numbers at the left end represent the order from the object side, d$_0$ represents the distance between the foremost lens surface of the rear conversion lens apparatus and the image point by the objective lens, D$_0$ represents the distance from the foremost lens surface of the objective lens to the object point, D$_1$ represents the air space between the objective lens and the rear conversion lens apparatus, f$_1$ represents the focal length of the forward subgroup of the rear conversion lens apparatus, f$_2$ represents the focal length of the rearward subgroup of the rear conversion lens apparatus, B$_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

19. A rear conversion lens apparatus according to claim 12, wherein numerical data are as follows:
Magnification: $\beta = 1.6$ Focal length $f_R = -70.201$

| No. | Radius of curvature r | Center thickness and air space of lens d | Refractive index n | Abbe number ν |
|---|---|---|---|---|
| | (G$_1$) | | | |
| 1 | 82.983 | 0.9 | 1.87739 | 38.1 |
| 2 | 31.768 | 0.3 | | |
| 3 | 33.000 | 4.5 | 1.59507 | 35.5 |
| 4 | −43.160 | 2.5 | | |
| | (G$_2$) | | | |
| 5 | −39.320 | 0.9 | 1.84042 | 43.3 |
| 6 | 50.000 | 3.5 | 1.59507 | 35.5 |
| 7 | −46.820 | 0.9 | 1.84042 | 43.3 |
| 8 | 119.922 | 0.2 | | |
| 9 | 46.047 | 2.4 | 1.51118 | 50.9 |
| 10 | 183.191 | | | |

| F = 82.56 | | M = −0.045 |
|---|---|---|
| D$_0$ | ∞ | 1818.611 |
| D$_1$ | 1.0 | 3.471 |
| B$_f$ | 41.043 | 38.572 |

$d_0 = -36.605$
$f_1 = 67.245$
$f_2 = -32.708$
$\Delta B_f = -2.471$ where the numbers at the left end represent the order from the object side, d$_0$ represents the distance between the foremost lens surface of the rear conversion lens apparatus and the image point by the objective lens, D$_0$ represents the distance from the foremost lens surface of the objective lens to the object point, D$_1$ represents the air space between the objective lens and the rear conversion lens apparatus, f$_1$ represents the focal length of the forward subgroup of the rear conversion lens apparatus, f$_2$ represents the focal length of the rearward subgroup of the rear conversion lens apparatus, B$_f$ represents the back focal length of the opposite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

20. A rear conversion lens apparatus according to claim 12, wherein numerical data are as follows:
Magnification: $\beta = 1.6$ Focal length $f_R = -70.937$

| No. | Radius of curvature r | Center thickness and air space of lens d | Refractive index n | Abbe number ν |
|---|---|---|---|---|
| | (G$_1$) | | | |
| 1 | 167.658 | 1.0 | 1.84042 | 43.3 |
| 2 | 33.242 | 0.3 | | |
| 3 | 36.248 | 4.5 | 1.59507 | 35.5 |
| 4 | −42.824 | 3.0 | | |
| | (G$_2$) | | | |
| 5 | −55.234 | 1.5 | 1.78797 | 47.5 |
| 6 | −82.202 | 0.8 | | |
| 7 | −39.911 | 0.9 | 1.84042 | 43.3 |
| 8 | 129.411 | 0.2 | | |
| 9 | 48.000 | 2.0 | 1.59507 | 35.5 |
| 10 | 116.867 | | | |

| F = 82.56 | | M = −0.055 |
|---|---|---|
| D$_0$ | ∞ | 1485.166 |
| D$_1$ | 1.0 | 4.045 |
| B$_f$ | 42.277 | 39.233 |

$d_0 = -36.605$
$f_1 = 96.531$
$f_2 = -39.688$
$\Delta B_f = -3.045$ where the numbers at the left end represent the order from the object side, d$_0$ represents the distance between the foremost lens surface of the rear conversion lens apparatus and the image point by the objective lens, D$_0$ represents the distance from the foremost lens surface of the objective lens to the object point, D$_1$ represents the air space between the objective lens and the rear conversion lens apparatus, f$_1$ represents the focal length of the forward subgroup of the rear conversion lens apparatus, f$_2$ represents the focal length of the rearward subgroup of the rear conversion lens apparatus, B$_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

21. A rear conversion lens apparatus according to claim 12, wherein numerical data are as follows:
Magnification: $\beta = 1.6$ Focal length $f_R = -71.201$

| No. | Radius of curvature r | Center thickness and air space of lens d | Refractive index n | Abbe number ν |
|---|---|---|---|---|
| | (G₁) | | | |
| 1 | 94.020 | 1.0 | 1.84042 | 43.3 |
| 2 | 29.896 | 0.6 | | |
| 3 | 36.248 | 4.5 | 1.59507 | 35.5 |
| 4 | −40.400 | 1.5 | | |
| | (G₂) | | | |
| 5 | −55.234 | 1.5 | 1.78797 | 47.5 |
| 6 | −82.202 | 1.5 | | |
| 7 | −39.804 | 0.9 | 1.84042 | 43.3 |
| 8 | 129.411 | 0.2 | | |
| 9 | 34.000 | 2.0 | 1.59507 | 35.5 |
| 10 | 49.450 | | | |
| | F = 82.56 | | M = −0.055 | |
| $D_0$ | ∞ | | 1485.322 | |
| $D_1$ | 1.0 | | 4.044 | |
| $B_f$ | 42.887 | | 39.843 | |

$d_0 = -36.605$
$f_1 = 80.526$
$f_2 = -36.604$
$\Delta B_f = -3.044$ where the numbers at the left end represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

22. A rear conversion lens apparatus according to claim 12, wherein numerical data are as follows:
Magnification: $\beta = 1.6$ Focal length $f_R = -71.603$

| No. | Radius of curvature r | Center thickness and air space of lens d | Refractive index n | Abbe number ν |
|---|---|---|---|---|
| | (G₁) | | | |
| 1 | 187.686 | 1.0 | 1.80411 | 46.4 |
| 2 | 31.726 | 0.3 | | |
| 3 | 36.248 | 4.0 | 1.59507 | 35.5 |
| 4 | −40.574 | 0.3 | | |
| 5 | −66.018 | 1.5 | 1.84042 | 43.3 |
| 6 | −64.555 | 3.0 | | |
| | (G₂) | | | |
| 7 | −35.234 | 1.0 | 1.84042 | 43.3 |
| 8 | 111.091 | 0.2 | | |
| 9 | 36.000 | 2.5 | 1.56732 | 42.7 |
| 10 | 60.398 | | | |
| | F = 82.56 | | M = −0.055 | |
| $D_0$ | ∞ | | 1485.555 | |
| $D_1$ | 1.0 | | 4.043 | |
| $B_f$ | 42.934 | | 39.891 | |

$d_0 = -36.605$
$f_1 = 93.554$
$f_2 = -39.591$
$\Delta B_f = -3.043$ where the numbers at the left end represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

23. A rear conversion lens apparatus according to claim 12, wherein numerical data are as follows:
Magnification: $\beta = 1.6$ Focal length $f_R = -72.800$

| No. | Radius of curvature r | Center thickness and air space of lens d | Refractive index n | Abbe number ν |
|---|---|---|---|---|
| | (G₁) | | | |
| 1 | 417.231 | 1.0 | 1.84042 | 43.3 |
| 2 | 26.572 | 4.5 | 1.61293 | 37.0 |
| 3 | −40.846 | 4.0 | | |
| | (G₂) | | | |
| 4 | −35.938 | 1.0 | 1.84042 | 43.3 |
| 5 | 124.848 | 0.2 | | |
| 6 | 41.171 | 2.5 | 1.59507 | 35.5 |
| 7 | 83.046 | | | |
| | F = 82.56 | | M = −0.06 | |
| $D_0$ | ∞ | | 1360.865 | |
| $D_1$ | 1.0 | | 4.332 | |
| $B_f$ | 43.359 | | 40.027 | |

$d_0 = -36.605$
$f_1 = 114.603$
$f_2 = -43.570$
$\Delta B_f = -3.332$ where the numbers at the left end represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

24. A rear conversion lens apparatus according to claim 12, wherein the forward subgroup of positive refractive power and the rearward subgroup of negative refractive power which form said negative lens group are movable along the optic axis at different speeds.

25. A rear conversion lens apparatus according to claim 24, satisfying the following conditions:

$$-10 < \alpha \leq 0$$

$$\alpha_1 < 0$$

$$0 < \alpha_2 < 1$$

where $\alpha_1$ and $\alpha_2$ are the rates of variation of the amount of variation $\Delta D_1$ in the spacing between said objective lens and said forward subgroup during the infinity in-focus to the finite distance in-focus and the amount of variation $\Delta D_2$ in the spacing between said forward subgroup and said rearward subgroup, respectively, to the amount of variation $\Delta B_f$ in the combined back focal length of said objective lens and said rear conversion lens apparatus, and $\alpha$ is defined as $\alpha = \alpha_1 + \alpha_2 + 1$.

26. A rear conversion lens apparatus according to claim 25, wherein numerical data are as follows:
Magnification: $\beta = 1.6$ Focal length $f_R = -68.833$

| No. | Radius of curvature r | Center thickness and air space of lens d | Refractive index n | Abbe number ν |
|---|---|---|---|---|
|  | ($G_1$) |  |  |  |
| 1 | 83.096 | 1.0 | 1.87739 | 38.1 |
| 2 | 30.748 | 0.3 |  |  |
| 3 | 33.000 | 4.0 | 1.59507 | 35.5 |
| 4 | −50.075 | (variable) |  |  |
|  | ($G_2$) |  |  |  |
| 5 | −47.917 | 1.0 | 1.84042 | 43.3 |
| 6 | 50.000 | 3.0 | 1.59507 | 35.5 |
| 7 | −56.281 | 0.5 |  |  |
| 8 | −46.820 | 1.0 | 1.84042 | 43.3 |
| 9 | 129.553 | 0.2 |  |  |
| 10 | 46.047 | 2.5 | 1.51118 | 50.9 |
| 11 | 219.390 |  |  |  |
|  | F = 82.56 |  | M = −0.15 |  |
| $D_0$ | ∞ |  | 572.968 |  |
| $D_1$ | 1.0 |  | 6.752 |  |
| $d_4$ | 3.0 |  | 2.712 |  |
| $B_f$ | 40.134 |  | 39.271 |  |

$d_0 = -36.605$
$f_1 = 82.740$
$f_2 = -35.800$
$\Delta B_f = -0.863$
$\alpha = -5.331$
$\alpha_1 = -6.665$
$\alpha_2 = 0.334$ where the numbers at the left end represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

27. A rear conversion lens apparatus according to claim 25, wherein numerical data are as follows:
Magnification: $\beta = 1.6$ Focal length $f_R = -70.202$

| No. | Radius of curvature r | Center thickness and air space of lens d | Refractive index n | Abbe number ν |
|---|---|---|---|---|
|  | ($G_1$) |  |  |  |
| 1 | 82.983 | 0.9 | 1.87739 | 38.1 |
| 2 | 31.768 | 0.3 |  |  |
| 3 | 33.000 | 4.5 | 1.59507 | 35.5 |
| 4 | −43.160 | (variable) |  |  |
|  | ($G_2$) |  |  |  |
| 5 | −39.320 | 0.9 | 1.84042 | 43.3 |
| 6 | 50.000 | 3.5 | 1.59507 | 35.5 |
| 7 | −46.820 | 0.9 | 1.84042 | 43.3 |
| 8 | 119.922 | 0.2 |  |  |
| 9 | 46.047 | 2.4 | 1.51118 | 50.9 |
| 10 | 183.190 |  |  |  |
|  | F = 82.56 |  | M = −0.15 |  |
| $D_0$ | ∞ |  | 568.502 |  |
| $D_1$ | 1.0 |  | 7.166 |  |
| $d_4$ | 2.5 |  | 2.253 |  |
| $B_f$ | 41.043 |  | 39.193 |  |

$d_0 = -36.605$
$f_1 = 67.245$
$f_2 = -32.708$
$\Delta B_f = -1.850$
$\alpha = -2.200$
$\alpha_1 = -3.333$
$\alpha_2 = 0.134$ where the numbers at the left end represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

28. A rear conversion lens apparatus according to claim 25, wherein numerical data are as follows:
Magnification: $\beta = 1.6$ Focal length $f_R = -72.800$

| No. | Radius of curvature r | Center thickness and air space of lens d | Refractive index n | Abbe number ν |
|---|---|---|---|---|
|  | ($G_1$) |  |  |  |
| 1 | 417.231 | 1.0 | 1.84042 | 43.3 |
| 2 | 26.572 | 4.5 | 1.61293 | 37.0 |
| 3 | −40.846 | (variable) |  |  |
|  | ($G_2$) |  |  |  |
| 4 | −35.938 | 1.0 | 1.84042 | 43.3 |

-continued

| | | | | |
|---|---|---|---|---|
| 5 | 124.848 | 0.2 | | |
| 6 | 41.171 | 2.5 | 1.59507 | 35.5 |
| 7 | 83.046 | | | |
| | F = 82.56 | | M = −0.06 | |
| $D_0$ | ∞ | | 1361.404 | |
| $D_1$ | 1.0 | | 4.701 | |
| $d_3$ | 4.0 | | 3.815 | |
| $B_f$ | 43.359 | | 39.843 | |

$d_0 = -36.605$
$f_1 = 114.603$
$f_2 = -43.570$
$\Delta B_f = -3.516$
$\alpha = 0$
$\alpha_1 = -1.053$
$\alpha_2 = 0.053$ where the numbers at the left end represent the order from the object side, $d_0$ represents the distance between the foremost lens surface of the rear conversion lens apparatus and the image point by the objective lens, $D_0$ represents the distance from the foremost lens surface of the objective lens to the object point, $D_1$ represents the air space between the objective lens and the rear conversion lens apparatus, $f_1$ represents the focal length of the forward subgroup of the rear conversion lens apparatus, $f_2$ represents the focal length of the rearward subgroup of the rear conversion lens apparatus, $B_f$ represents the back focal length of the composite system of the rear conversion lens apparatus and the objective lens, $\Delta B_f$ represents the amount of variation in the back focal length during the infinity in-focus and the close distance in-focus by the rear conversion lens apparatus, F represents the combined focal length of the rear conversion lens apparatus and the objective lens, and M represents the photographing magnification of the composite system.

* * * * *